United States Patent
Strazzanti

(10) Patent No.: US 7,029,151 B2
(45) Date of Patent: *Apr. 18, 2006

(54) LAMP MASKING METHOD AND APPARATUS

(75) Inventor: Michael Strazzanti, Gates Mills, OH (US)

(73) Assignee: Illume L.L.C., Gates Mills, OH (US)

( * ) Notice: Subject to any disclaimer, the term of this patent is extended or adjusted under 35 U.S.C. 154(b) by 145 days.

This patent is subject to a terminal disclaimer.

(21) Appl. No.: 10/442,035

(22) Filed: May 20, 2003

(65) Prior Publication Data

US 2003/0202357 A1 Oct. 30, 2003

Related U.S. Application Data

(63) Continuation-in-part of application No. 10/419,519, filed on Apr. 21, 2003, now Pat. No. 6,913,375, and a continuation-in-part of application No. PCT/US02/16161, filed on May 22, 2002, which is a continuation-in-part of application No. 10/108,827, filed on Mar. 27, 2002, now Pat. No. 6,550,943, which is a continuation-in-part of application No. 09/967,437, filed on Sep. 28, 2001, now Pat. No. 6,558,026, which is a continuation-in-part of application No. 09/865,402, filed on May 25, 2001, now Pat. No. 6,491,416.

(51) Int. Cl.
*B60Q 1/06* (2006.01)

(52) U.S. Cl. .................... 362/467; 362/464; 362/512; 362/318

(58) Field of Classification Search ................ 362/464, 362/467, 512, 318
See application file for complete search history.

(56) References Cited

U.S. PATENT DOCUMENTS

| | | | |
|---|---|---|---|
| 2,628,927 A | 2/1953 | Colbert et al. |
| 2,740,732 A | 4/1956 | Peck et al. |
| 3,001,901 A | 9/1961 | Barkley |
| 3,020,376 A | 2/1962 | Hofmann et al. |
| 3,512,876 A | 5/1970 | Marks |
| 3,708,219 A | 1/1973 | Forlini et al. |

(Continued)

OTHER PUBLICATIONS

Fujii et al, "Light-Controllable Spot Luminaires Using a Liquid Crystal Light Shuter and a High-Intensity Discharge Lamp", J. Light & Vis. Env. pp. 13-23, vol. 26, No. 1.

*Primary Examiner*—Thomas M. Sember
(74) *Attorney, Agent, or Firm*—Watts Hoffmann Co.LPA

(57) ABSTRACT

A motor vehicle lamp assembly having a light source for emitting light and an enclosure having a two light transmissive portions for transmitting light from the light source to the illumination zones. The enclosure is affixed with a material which covers selected regions of the light transmissive portion. The material is electrically energized to alter an amount of light transmitted from the source to the illumination zones. A drive circuit electrically coupled to the material energizes the material to control a light output from the lamp assembly. The lamp assembly can simultaneously provide light in the direction of travel of the vehicle along with cornering lighting and turn signal function. The lamp assembly also includes a rear-projection lamp incorporating an optic lens. In addition, the assembly is configured to provide for various head-lamp functions including an advanced front lighting system.

37 Claims, 13 Drawing Sheets

U.S. PATENT DOCUMENTS

| | | |
|---|---|---|
| 4,142,229 A | 2/1979 | Hulbert, Jr. |
| 4,209,825 A | 6/1980 | Shackelford |
| 4,727,458 A | 2/1988 | Droste et al. |
| 4,814,960 A | 3/1989 | Liu |
| 4,839,779 A | 6/1989 | Kasboske |
| 4,868,726 A | 9/1989 | Segoshi |
| 4,985,816 A | 1/1991 | Seko et al. |
| 5,023,758 A | 6/1991 | Allen et al. |
| 5,111,105 A | 5/1992 | Yamamoto |
| 5,113,319 A | 5/1992 | Sekiguchi et al. |
| 5,438,486 A | 8/1995 | McNair |
| 5,463,491 A | 10/1995 | Check, III |
| 5,467,217 A | 11/1995 | Check, III et al. |
| 5,517,389 A | 5/1996 | Myers |
| 5,660,462 A | 8/1997 | Bockley et al. |
| 5,728,251 A | 3/1998 | Check, III |
| 5,829,870 A | 11/1998 | Remillard et al. |
| 5,938,323 A | 8/1999 | McMahan |
| 6,017,138 A | 1/2000 | Reiss et al. |
| 6,049,171 A | 4/2000 | Stam et al. |
| 6,114,405 A | 9/2000 | Zhuang et al. |
| 6,126,301 A | 10/2000 | Altunay et al. |
| 6,156,239 A | 12/2000 | Saxe et al. |
| 6,281,632 B1 | 8/2001 | Stam et al. |
| 6,429,594 B1 | 8/2002 | Stam et al. |
| 6,593,698 B1 | 7/2003 | Stam et al. |
| 6,861,809 B1 | 3/2005 | Stam |

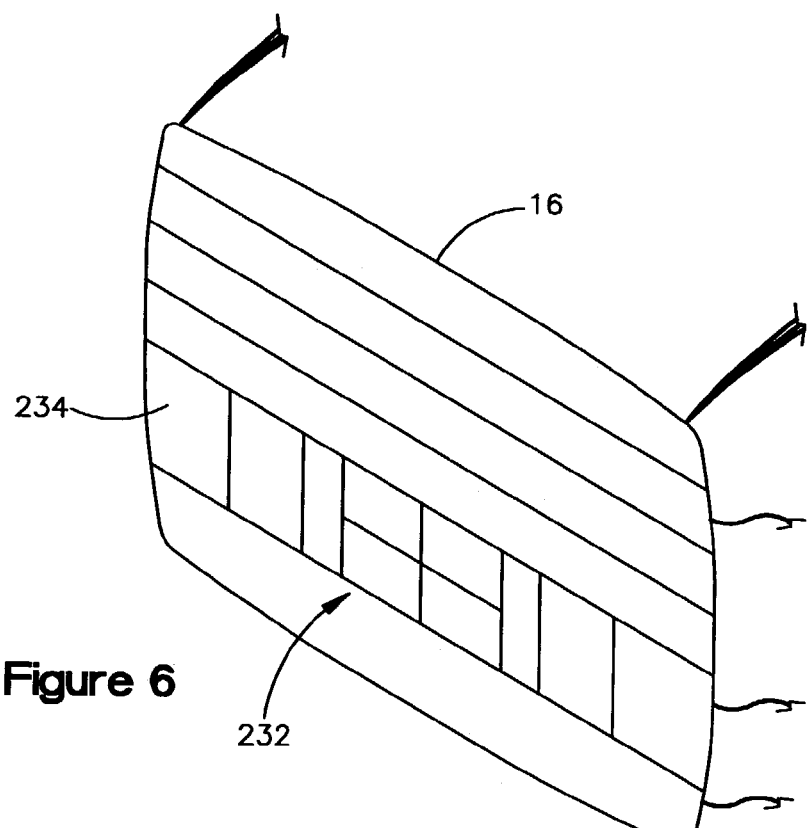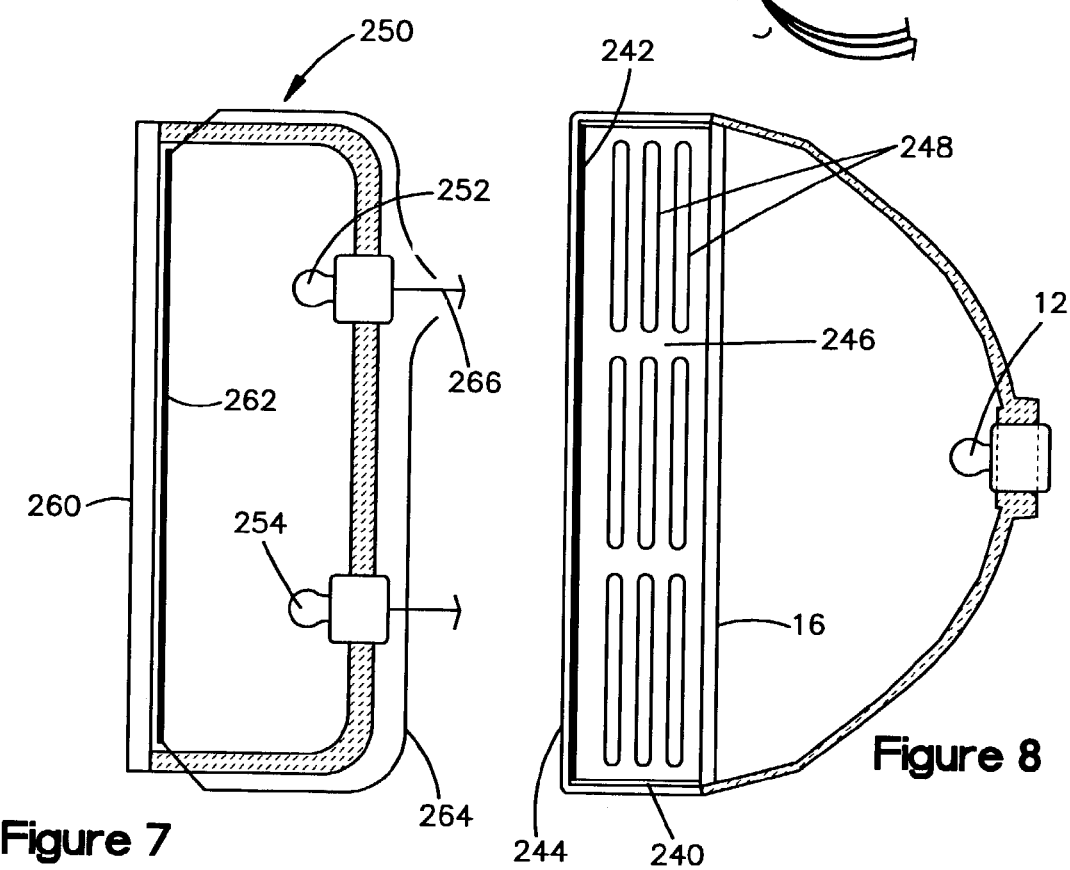

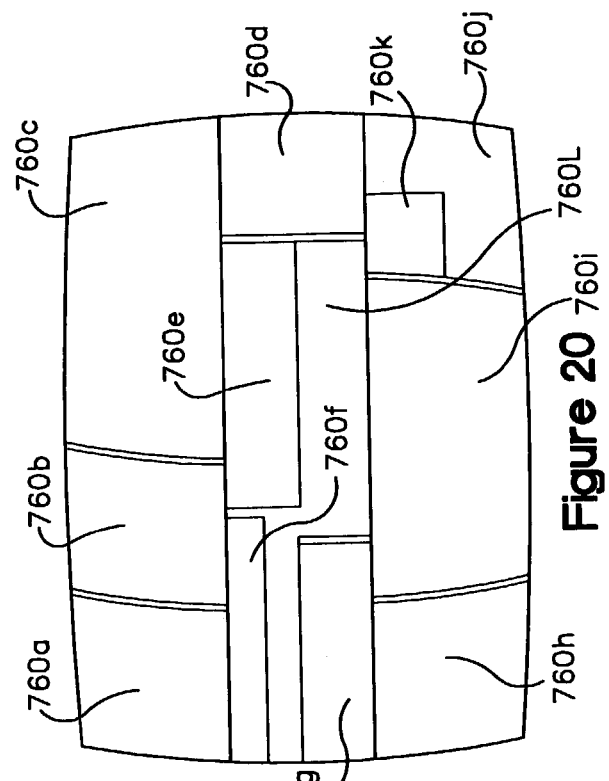
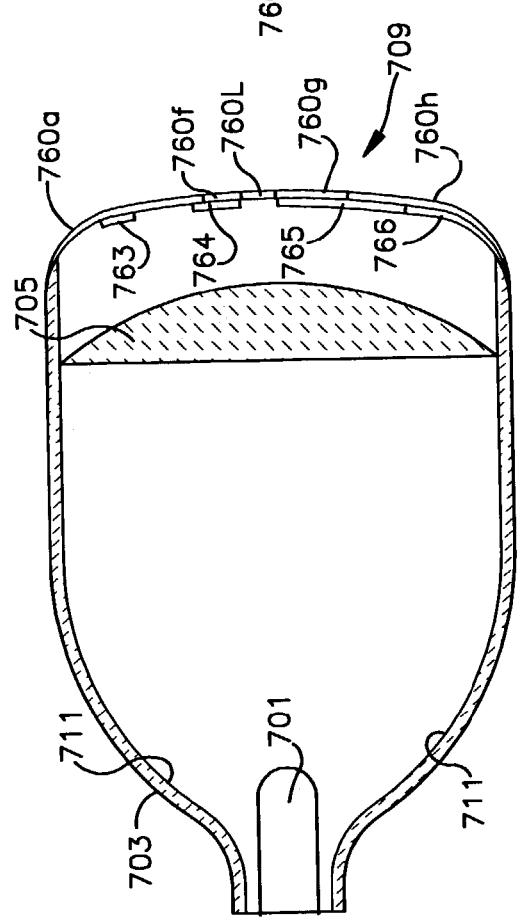

LAMP MASKING METHOD AND APPARATUS

CROSS REFERENCE TO RELATED APPLICATIONS

The present application is a continuation in part application containing common subject matter with presently U.S. patent application Ser. No. 10/419,519 which was filed in the United States Patent and Trademark Office on Apr. 21, 2003 now U.S. Pat No. 6,913,375 and International Patent Application No. PCT/US02/16161 filed May 22, 2002 which are both continuations in part of U.S. patent application Ser. No. 10/108,827 which was filed in the United States Patent and Trademark Office on Mar. 27, 2002, now U.S. Pat. No. 6,550,943, issued Apr. 22, 2003, which is a continuation in part containing common subject matter with U.S. application Ser. No. 09/967,437 which was filed in the United States Patent and Trademark office on Sep. 28, 2001, now U.S. Pat. No. 6,558,026, issued May 6, 2003, which is a continuation in part containing common subject matter U.S. patent application Ser. No. 09/865,402 which was filed in the United States Patent and Trademark Office on May 25, 2001 and which is entitled "Headlamp Masking Method and Apparatus," now U.S. Pat. No. 6,491,416, issued Dec. 10, 2002. The subject matter of these co-pending patent applications and issued patents is incorporated herein by reference.

FIELD OF THE INVENTION

The present invention concerns a vehicle lamp having a control for selectively rendering portions of the lamp light transmissive under vehicle operator control.

BACKGROUND ART

All motor vehicles include a control for switching between high beam and low beam operation of the motor vehicle headlamps. This control may be implemented by a floor mounted switch but most typically in more recent designed motor vehicles is implemented with a stalk on the vehicle steering column that is easily actuated by a motor vehicle operator.

When the high beam option is selected, the vehicle headlamps are focused in a direction that illuminates further in advance of the vehicle to improve a motorist's ability to see details in his or her line of sight. When an oncoming vehicle approaches, the motorist can switch to low beam operation to avoid temporarily blinding the oncoming driver. Fog lamps are occasionally installed on vehicles to direct a lamp output downward in a direction closer to the vehicle to enable the motorist to more clearly see during rain and foggy conditions.

Vehicle head lamps most typically contain two separate light bulbs that can be independently activated. When one of the bulbs is activated, a low beam lamp output is produced and when a second bulb of the two bulbs is activated a high beam lamp output is provided. In the 1980's when headlamps having halogen light bulbs were first built, the government enacted photometric tests. These tests dictated that light of a high enough intensity to cause spot blindness in other motorists did not reach certain regions in a space in front of a motor vehicle headlamp. Spot blindness was only a problem for halogen lights since these lights produce a much more intense output when compared with non-halogen lamps.

U.S. Pat. No. 5,517,389 to Meyers concerns an electrochromic lamp assembly including a reflector having two or more reflective surfaces. A light source and an electrochromic means is positioned between the light source and at least one reflective surface. Each reflective surface directs light in a different direction. The electrochromic means is capable of blocking light from exiting the lamp assembly from at least one direction.

U.S. Pat. No. 5,988,837 to Eichhorn et al. discusses a method for adjusting a vehicle headlight during cornering by superimposing a light distribution pattern with a greater horizontal dispersion than that of a low-bam light onto the low-beam light distribution pattern. Further, fog-light distribution pattern is superimposed onto a low beam light distribution pattern by superimposing the fog-light distribution pattern onto the low-beam light distribution pattern, cornering light with improved laterial illmination is achieved in an uncomplicated manner. A single headlight is used for generating the cornering light by a signal from a sensor which is utilized by an electronic drive for controlling an electric motor so that changes in the cornering light distribution pattern are countered by pivoting a reflector.

FIGS. 1a and 1b show a rear-projection headlamp according to the prior art. A light source 601 is positioned in a headlamp housing 603. A focusing lens 605 is positioned in the housing 603 such that it maximizes the light output of from the light source. A metal stamping 607 is positioned in the housing 603 between the light source 601 and the lens 605. The housing also includes a clear lens cover 609 which covers and protects the lens 605. The internal portion 611 of the housing 603 is coated with a reflective material that reflects light emitted from the light source through the lens 605 and out of the headlamp to an illumination zone. The stamping 607 is used to block unwanted light from being emitted from the light source 601. The light blocked is that which if allowed to exit the headlamp would continue to an upper light field blinding oncoming motorists. The stamping 607 is located at the bottom of the headlamp assembly due to the fact that the lens 605 inverts the light field emitted from the light source 601 as reflected by the reflective coating on the internal portion 609 of the housing 603. This prior art method meets the horizontal cutoff and other photometric test points by utilization of the stamping structure. The drawback to this method is that the lamp is not utilizing the light blocked by the stamping causing decrease light output for any give light source. Therefore, there is a need in the art for a headlamp assembly which can make use of this light thus increasing light output while still meeting the horizontal cutoff and photometric test points.

SUMMARY OF THE INVENTION

The present invention is directed to a headlamp assembly. The assembly includes a light source for emitting light from the assembly. The light source is located in an enclosure having a first light transmissive portion which permits light to be emitted from the light source to a first illumination zone located in the front of the assembly and a second light transmissive portion which permits light to be emitted from the light source to a second illumination zone located to the side of the assembly. Selected regions of the first light transmissive portion and the second light transmissive portion of the enclosure are covered with a material that when electrically energized alters the amount of light transmitted from the light source to the first illumination zone and second illumination zone. A drive circuit is coupled to the material for selectively energizing the material and thereby controlling the light output from the headlamp assembly.

In a preferred embodiment, the first illumination zone is located in the direction of travel of the vehicle and the second illumination zone is located in the direction of turn of the vehicle. In another embodiment, the material is made up of liquid crystal. The liquid crystal material can be any liquid crystal material as know to those of skill in the art including but not limited to regular mode, reverse mode, beam steering, light scattering and high contrast. The first and second light transmissive portions of the enclosure may have affixed thereto multiple sections of liquid crystal material which can be independently energized. These sections may include multiple layers of liquid crystal material which allow for multiple lamp functions. Independent energization allows for each section to perform different headlamp functions independent of the other sections. In a preferred embodiment, the multiple sections affixed to the second light transmissive portion illuminate the second illumination zone in proportion to the degree of turn of the vehicle. In addition, these multiple sections may be used for turning signal.

The light source, preferably, is made up of a single multi-filament headlamp bulb where one filament is of higher intensity for higher light output functions and the other filament is of lower intensity for lower light output functions. Light sources can include but not limited to High Intensity Discharge (HID), Halogen, Flouorescent, Incandescent, and High Intensity Light emitting diode/diodes. The invention also contemplates the use of two separate light sources, one of higher intensity and one of lower intensity. The higher intensity source is preferably used for higher light output functions, such as high beam, low beam and fog, illuminating the first illumination zone whereas the lower intensity light source is used for lower intensity light functions, such as cornering light, turning signal and running light, illuminating the second illumination zone.

The present invention is also directed to a process for constructing a headlamp assembly. The process involves positioning a light source within an enclosure having a first light transmissive portion for transmitting light from the light source to a first illumination zone and a second light transmissive portion for transmitting light from the light source to a second illumination zone. A material is then affixed to the enclosure to cover selected regions of the first light transmissive portion and the second light transmissive portion. The material is then coupled to a drive circuit for selectively energizing the material which when electrically energized alters the light transmitted to the first illumination zone and the second illumination zone.

Preferably, the material affixed to the first light transmissive portion and second light transmissive portion is layered. The layers are isolated from each other to allow for independent energization. In another embodiment, the material is organized in bands across the surface of the light transmissive portions. The bands are then independently coupled to the drive circuit to control the light transmitting characteristics of each band providing for multiple headlamp functions such as fog, low beam, high beam, cornering, turning signal and running light. Optionally, an interface for monitoring multiple inputs that control the light transmissive states of the bands may be included. The material is preferably energized by providing a pulse width modulating signal to an associated region of material on either the first light transmissive portion or the second light transmissive portion.

The present invention may also be incorporated into a rear-projection lamp assembly. The rear-projection assembly includes a light source positioned in a light source enclosure having a light transmissive portion for transmitting light from the light source to an illumination zone and a reflective portion for reflecting light emitted from the light source through light transmissive portion to the illumination zone. A portion of the enclosure preferably includes a material which covers selected regions of the light transmissive portion of the enclosure and which when electrically energized alters the light emitted from the assembly. An optic lens is also positioned within the enclosure a distance from the light source such as to enhance the light output of the light source. A drive circuit is electrically coupled to the material for altering the light output of the assembly. The rear-projection headlamp assembly may be adapted for use in a motor vehicle.

In one embodiment, the drive circuit includes a user interface including a switch selector, a programmable controller for responding to the setting of the switch selector to produce a set of driver outputs and a driver circuit coupled to the material to apply an alternating signal to the material to alter the light transmissive characteristics of the material. The drive circuit may include a control output for adjusting a level of light transmission from the light source through a region of said material at a high level of light transmission, a low level of light transmission and at least one intermediate level of light transmission. It is preferred that wire leads attached to the drive circuit are in communication with the material so that an electrical signal may be routed from the drive circuit to the material to alter the light transmitting properties of the material. The wire leads may be embedded in the light transmissive portion of the enclosure. The drive circuit may additionally include an interface for monitoring multiple inputs that control the light transmitting state and properties of the material. The inputs may be photo sensors, inclination sensors, turning sensor, vehicular speed sensors, and driver reaction sensors. In one embodiment, light is aimed in the direction of turn of the vehicle in proportion to the degree of turn based on an input from a turning sensor.

In another embodiment, the material is aligned in horizontal bands. The light transmissive properties of the bands may be a function of input from a sensor to the drive circuit.

The invention also contemplates a method of constructing a rear-projection light assembly by positioning a light source that emits light and an optical lens within an enclosure having a reflective portion and a light transmissive portion for transmitting light from the light source to an illumination zone. The material is then affixed to the enclosure to cover selected regions of the light transmissive portion. The material is further coupled to a drive circuit for altering the light emitted from the light source to the illumination zone. In one embodiment of the process, the material is coupled to the light transmissive portion in layers that are isolated from each other to allow independent energization of the overlapping layers. The material may be organized in multiple sections across the surface of the light transmissive portion of the assembly and the material in each section coupled to the drive circuit independently to allow independent control over the light transmitting characteristics of the sections during operation of the assembly. Independent control of the sections can allow for multiple headlamp functions such as fog lamp output, a low beam output, cornering light output in the direction of travel of the vehicle, and a high beam output. A user interface may be employed for monitoring multiple inputs that control the light transmissive state of the bands.

Additionally, the method may include additional regions of material that overlap one or more of the multiple sections of the material coupled to the driver circuit to independently control the light transmissive state of these sections. The method may also include energizing the material to adjust a level of light transmission from a light source through a region of said material to a high light transmission state, a low light transmission state, or one or more intermediate light transmission states. The energizing of the material may be performed by providing a pulse width modulation signal for adjusting a light transmissive state of an associated section of material.

BRIEF DESCRIPTION OF THE DRAWINGS

FIG. 1a is a cross-sectional view of a headlamp assembly according to the prior art;

FIG. 1b is a front view of the headlamp assembly as shown in FIG. 1a;

FIG. 6 is a third alternate depiction of a headlamp assembly constructed in accordance with the invention;

FIG. 7 is a depiction of a tail lamp assembly constructed in accordance with the present invention;

FIG. 8 is a schematic depiction of a headlamp assembly including a lens cap for increasing a spacing of light transmitting control material from a light emitting bulb.

FIG. 19 is a cross-sectional view of a rear-projection headlamp according to the embodiments of the present invention; and FIG. 20 is a front view of the headlamp as shown in FIG. 19.

EXEMPLARY EMBODIMENT FOR PRACTICING THE INVENTION

Figure 1:
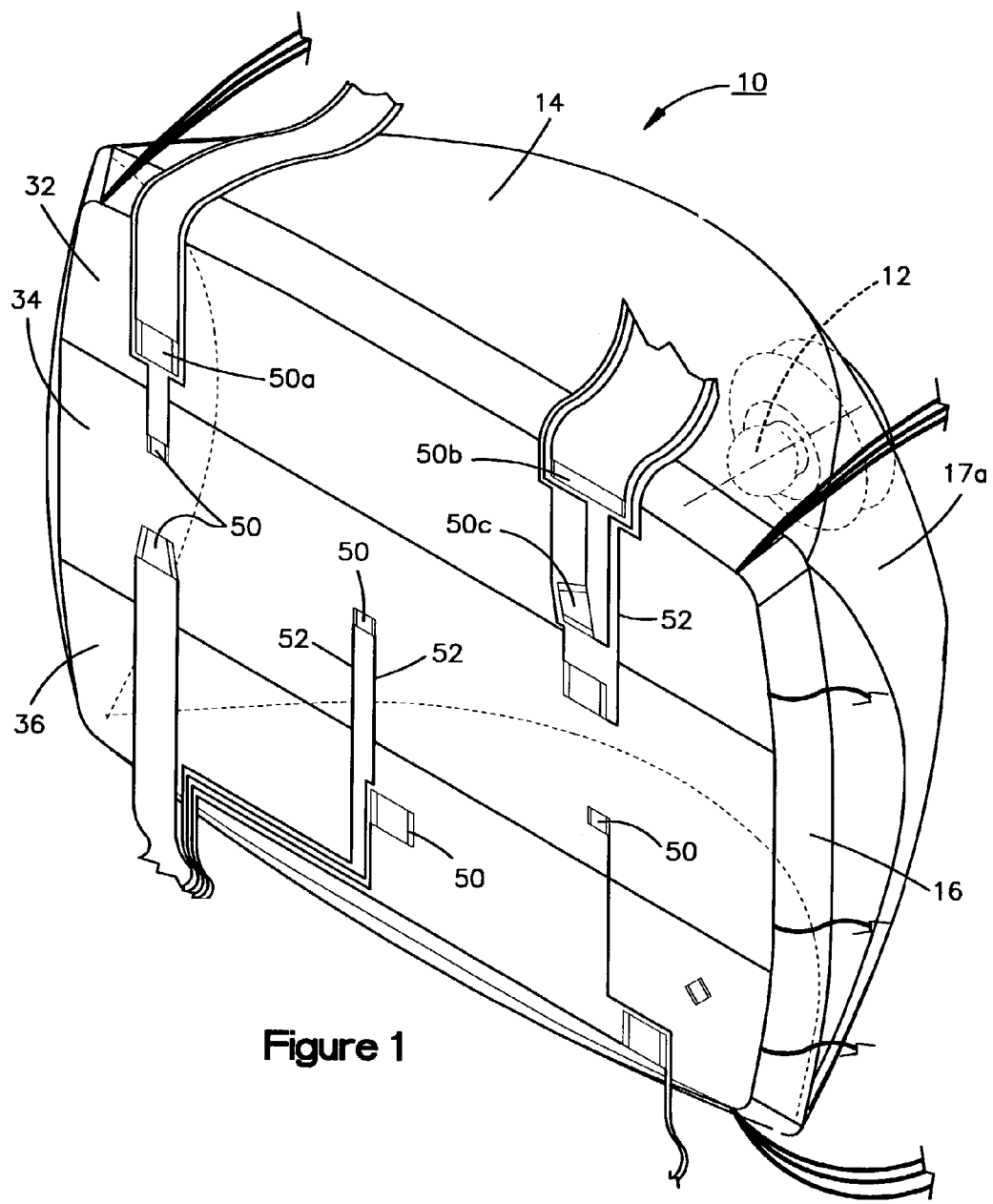
FIG. 1 is a perspective view of a headlamp assembly constructed in accordance with the present invention.
Figures 1A, 1B:
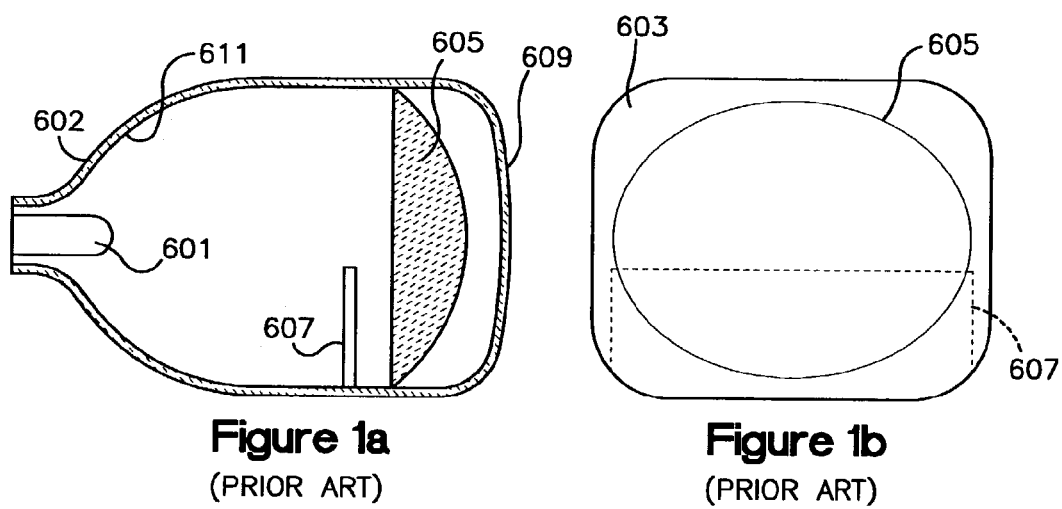

Turning now to the drawings, FIG. 1 illustrates a headlamp assembly 10 that includes a headlamp bulb 12 for emitting light mounted to a bulb housing 14 having a light transmissive portion or lens. 16 for emitting light from the headlamp bulb 12 to an illumination zone in front of the headlamp assembly 10. An interior surface 20 of the light bulb housing 14 reflects light reaching the surface 20 back into the housing interior so that it will exit the housing through the light transmissive portion 16.

The light transmissive portion of the housing is coated at specified regions with a coating material. When these regions are electrically energized the coating material is rendered more light transmissive to alter the amount of light transmitted from the bulb to the illumination zone. A drive circuit 30 (see FIG. 3) electrically coupled to the regions of coating material energizes the coating material and thereby control a light output from the headlamp assembly.

In accordance with the exemplary embodiment of the invention the light transmissive portion of the housing is coated with three bands 32, 34, 36 of the coating material. These bands are independently energized to adjust the light output from the headlamp assembly 10. The headlamp assembly 10 is for a motor vehicle. The opacity of the three bands 32, 34, 36 of coating material are selectively controlled to adjust the opacity of the three bands thereby producing a high beam output, a low beam output and a fog lamp output, respectively, from the headlamp assembly 10. In addition to the three bands 32, 34, 36, the disclosed embodiment of the invention includes a plurality of smaller regions 50 of coating material that are coupled to the drive circuit 30 by means of conductors 52 routed across the light transmissive portion of the housing. Both the bands 32, 34, 36 and additional smaller regions or patches 50 are most preferably built using cut to size sheets of a liquid crystal material. One example of a commercially available liquid crystal material for use in the present invention is Polymer Stabilized Technology (PST) liquid crystal material available from the Liquid Crystal Institute at Kent State University having a principal place of business at Summit Street, Kent, OHIO 44242. The PST material can also be found in U.S. Pat. Nos. 6,515,649, 6,249,271, and 5,251,048, hereby incorporated by reference in their entirety. In addition, the invention contemplates the use of liquid crystal material that can bend or steer light beams. An example of this type of liquid crystal is disclosed by Chuck Titus, Beam Steering (visited May 19, 2003) http://www.lci.kent.edu/boslab/projects/light deflection/index.html, hereby incorporated by reference in its entirety and available from the Liquid Crystal Institute website at http://www.lci.kent.edu. This sheet of material can be cut to an appropriate shape and applied to the light transmissive portion of the bulb housing.

The coating material may be affixed to the inside of the lens 16 with a translucent adhesive to protect the material from weathering that would occur outside the lens 16. The coating material may also be applied to an outer surface of the lens 16 using a protective laminate. Additionally the coating material may be a prefabricated panel, which is then clipped or locked into place when the headlamp assembly housing is constructed. Further, the liquid crystal may be insert molded into the clear lens with a wire lead embedded in the lens and in contact with the drive circuit.

The patches 50 are solely for photometric purposes and are not under direct control of the motorist. The patches are rendered opaque at any time that the headlamp bulb 12 is outputting light to create a field of illumination which is in accordance with governmental photometric standards. The patches 50 are made translucent or light transmitting by applying a current to the patches only when the headlamp bulb 12 is not producing light.

In the disclosed exemplary embodiment, the adhesive used to attach the liquid crystal material to the lens 16 is an electrically conductive adhesive. Use of the conductive adhesive avoids the use of metal on the sides of the patches 50 and allows wiring to connect to the adhesive that is applied along the outer edges of the liquid crystal material. This use of adhesive enhances the cosmetics of the lens 16 as well as eliminating the cost of edging the liquid crystal with copper or other conductive material. One suitable conductive adhesive is sold under the designation NOELLE 805-19 System, a two component (A+B) high performance, silver filled, room temperature curing adhesive that is available from Noelle Industries, Adhesives, Coatings and Conductives, 83 Alexander Rd. Unit 3 Billerica Mass. 01821.

Figure 9A:
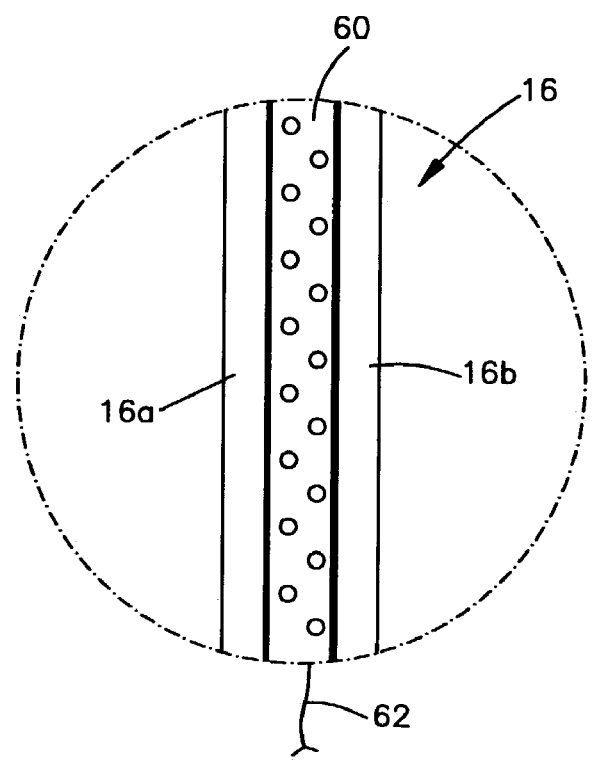
FIGS. 9A and 9B illustrate alternate arrangements for supporting light transmitting control material.
Figure 9B:
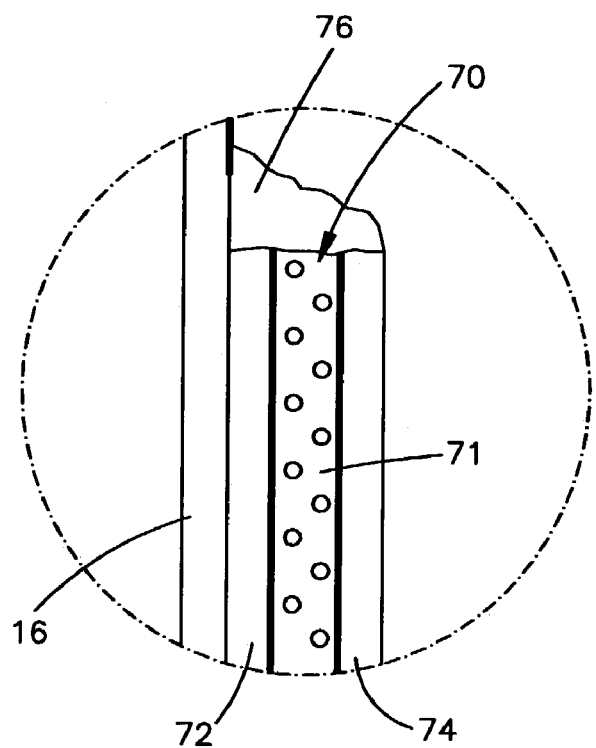

In an alternative mounting scheme, the lens 16 has a multiple layer construction. As seen in FIG. 9A a piece of liquid crystal material 60 is sandwiched between inner and an outer layers 16a, 16b of light transmitting plastic. In this alternate embodiment energizing leads or wires 62 are routed to Indium Tin Oxide layers on inner and outer surfaces of the liquid crystal material through a narrow gap between the inner and outer layers 16a, 16b of the lens 16. This multiplayer embodiment defines distinct regions of liquid crystal material but in a way wherein those regions are defined at the time the lens 16 is fabricated rather than at a subsequent time by applying liquid crystal regions to the lens by means of an adhesive. In an alternate embodiment shown in FIG. 9B a single lens 16 houses the bulb 12 and individual segments 70 of coating material are constructed by sandwiching a suitably sized and shaped liquid crystal material 71 between inner and outer layers 72, 74 of plastic. The resulting regions of coating material are then attached to the lens 16 using the conductive adhesive 76. As a modification to this design, the regions of coating material can be attached to the lens 16 by means of mechanical attaching hardware such as for example by means of clips that hold an array of such segments together as well as clips that attach the array to an outer surface of the lens 16.

Drive Circuit 30

Figure 3:
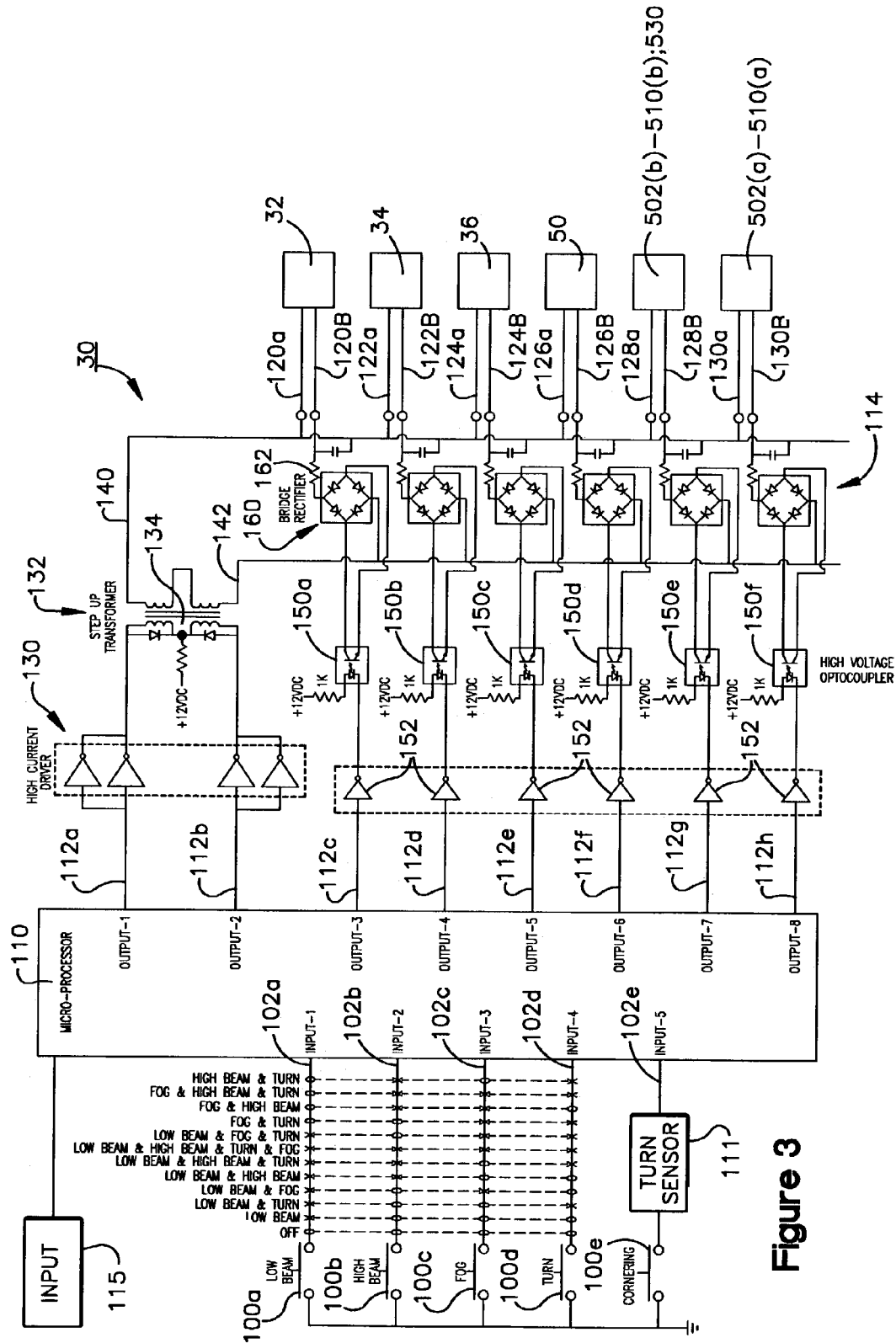
FIG. 3 is a schematic depiction of a drive circuit for activating control components of the headlamp assembly according to the present invention

Referring now to FIG. 3, the drive circuit 30 includes inputs 102a, 102b, 102c, 102d, 102e to a programmable controller 110. The programmable control includes a control program operating system that responds to the signals on the inputs 102a, 102b, 102c, 102d, 102e to produce on a set of controller outputs 112a–112h. A driver circuit 114 is coupled to the coating material to apply a pulse width modulated signal to the coating material for altering the light transmissive characteristics of the coating material. In accordance with the disclosed exemplary embodiment of the invention, the highest light transmission occurs when the band is activated with a significant alternating current square wave signal.

In accordance with the disclosed embodiment of the invention, there are three bands 32, 34, 36 of coating material. Each band is independently controlled by the controller 110. Thus, by referring to FIG. 3, one sees that the band 32 is coupled to two conductors 120a, 120b, the band 34 is coupled to the two conductors 122a, 122b, the band 36 is coupled to the two conductors 124a, 124b, bands 502b–510b, patches 530 and sections 520, 522, 524 are coupled by conductors 126a, 126b, and bands 502a–510a are coupled by conductors 128a, 128b. The light transmitting status of the other smaller regions 50 are controller by an output 112f so that the controller activates each of these regions to achieve approximately the same amount of light transmission. In accordance with the preferred embodiment of the invention, the bands 32, 34, 36 each overlap with one or more of the additional small regions or patches 50. Output 112g activates the liquid crystal material of the turning bands 502b–510b, patches 530 and sections 520, 522, 524. The turning bands 502b–510b are, preferably, all activated based on an input for the application of a turn signal function. The bands include two pieces of stacked liquid crystal material where one band includes a dichroic dye to obtain the necessary yellow light for a turning signal. The dyed band is activate during the turn. When no turn signal function is applied, the dyed liquid crystal material is clear and light transmissive. Outputs 112h activates the cornering liquid crystal material. The output 112h activates the bands 502a–510a in proportion to the degree of turn of the vehicle. The degree of turn is derived from the turn sensor 111 which monitors the steering mechanism and determines the amount of cornering light required for a particular turn. Therefore, not all of the bands 502a–510a, will be light transmissive for a particular turn unless such turn is the maximum available turn for the vehicle. For example, if the turn sensor 111 determines the turn to be 20% of a maximum available turn for the vehicle and there are 5 cornering bands, only one band will be rendered light transmissive. As the percentage of turn increases, more cornering bands 502a–510a become light transmissive. Thus providing more cornering light for sharper turns. The controller 110 is programmed to recognize a turn function and will send a pulsating current to the turning bands 502b–510b, patches 530 or sections 520, 522, 524. Likewise, the controller 110 recognizes the cornering function and sends the proper amount of current to the bands 502a–510a based on the input from the turn sensor 111.

Current is applied to the liquid crystal patches 50 when the headlamp bulb 12 is not emitting light. This provides an appearance of a clear headlamp lens. At any time the headlamp bulb 12 is producing light all the regions 50 are deprived of current so as to be in an opaque state. This prevents light from the bulb 12 from reaching photometric tests points located in front of the patches.

The programmable controller is programmed so that when one of the bands is driven to a state wherein the material that makes up that band is highly light transmissive, its associated smaller regions of material are in a state of low transmission, i.e. they are highly opaque. Consider the topmost band 32 in FIG. 1. This band 32 is covered in selected regions or zones by three additional smaller regions or patches 50a, 50b, 50c. When the band 32 is activated by the controller 110 to be highly light transmissive, the regions or patches 50a, 50b, 50c are not activated or energized, and consequently, are opaque. Since all patches are coupled to the same output from the controller 110 controls all the patches, when the patches 50a, 50b, 50c are opaque, the patches applied to overlap other bands of the lens are also opaque.

The signal input has five contacts 100a, 100b, 100c, 100d, 100e so that $2^5$ or thirty-two different control signal states can be generated as indicated in Table 1 that follows. As described below, the controller 110 also may be programmed to adjust the light transmitted from the lamp assembly to respond to whether the engine is running or the headlamps are turned on by the motorist. These inputs are referred to as 'control inputs' in the schematic depiction of FIG. 3.

TABLE 1

Control Signal States

| | |
|---|---|
| Lights Off | Current applied to all bands |
| High Beam On | Current applied to band 32, none on 34, 36 |
| Low Beam On | Current applied to band 34, none on 32, 36 |
| Fog Beam On | Current applied to band 36, none on 32, 34 |
| Low Beam with Fog | Current applied to band 34, 36, not 32 |
| High Beam with Fog | Current applied to bands 32, 36, not 34 |
| Low Beam with High Beam | Current applied to bands 32, 34, not 36 |
| Low Beam, High Beam and Fog | Current applied to all bands |
| High Beam with Turn | Current applied to band 32, pulsating current applied to bands 502b–510b, patches 530 or sections 520, 522, 524 |
| High Bean with Cornering | Current applied to band 32, 34, 36 and to band(s) 502–510a proportional to input from turn sensor |
| High Beam with Low Beam and Cornering | Current applied to band 32, 34 and to band(s) 502–510a proportional to input to turn sensor |
| High Beam with Low Beam and Turn | Current applied to band 32, 34 and pulse current applied to bands 502b–510b |
| High Beam, Low Beam, Fog and Cornering | Current applied to band 32, 34, 35 and to band(s) 502–510a proportional to input from turn sensor |
| High Beam, Low Beam, Fog and Turn | Current applied to band 32, 34, 36 and pulsating current applied to bands 502b–510b, patches 530 or sections 520, 522, 524 |
| High Beam, Low Beam, Fog, Turn and Cornering | Current applied to band 32, 34, 36, pulsating current applied to bands 502b–510b, patches 530 or sections 520, 522, 524 and current applied to band(s) 502–510a proportional to input from turn sensor |
| Low Beam and Cornering | Current applied to band 34 and to band(s) 502–510a proportional to input from turn sensor |
| Low Beam and Turn | Current applied to band 34 and pulsating current applied to bands 502b–510b, patches 530 or sections 520, 522, 524 |
| Low Beam, Fog and Cornering | Current applied to band 34, 36 and to band(s) 502–510a proportional to input from turn sensor |
| Low Beam, Fog and Turn | Current applied to band 34, 36 and pulsating current applied to bands 502b–510b, patches 530 or sections 520, 522, 524 |
| Low Beam, Fog, Turn and Cornering | Current applied to band 34, 36, pulsating current applied to bands 502b–510b, patches 530 or sections 520, 522, 524 and current applied to band(s) 502–510a proportional to input from turn sensor |
| Fog and Cornering | Current applied to band 36 and to band(s) 502–510a proportional to input from turn sensor |
| Fog and Turn | Current applied to band 36 and pulsating current applied to bands 502b–510b, patches 530 or sections 520, 522, 524 |
| Fog, Turn and Cornering | Current applied to band 36, pulsating current applied to bands 502b–510b, patches 530 or sections 520, 522, 524 and current applied to band(s) 502–510a proportional to input from turn sensor |
| Cornering | Current applied to band(s) 502–510a proportional to input from turn sensor |
| Cornering and Turn | Current applied to band(s) 502–510a proportional to input from turn sensor and pulsating current applied to bands 502b–510b, patches 530 or sections 520, 522, 524 |
| Turn | Pulsating current applied to bands 502b–510b, patches 530 or sections 520, 522, 524 |
| High Beam, Low Beam, Turn and Cornering | Current applied to band 32, 34, pulsating current applied to bands 502b–510b, patches 530 or sections 520, 522, 524 and current applied to band(s) 502–510a proportional to input from turn sensor |
| High Beam, Turn and | Current applied to band 32, pulsating |
| Cornering | current applied to bands 502b–510b, patches 530 or sections 520, 522, 524 and current applied to band(s) 502–510a proportional to input from turn sensor |
| Low Beam, Turn and Cornering | Current applied to band 34, pulsating current applied to bands 502b–510b, patches 530 or sections 520, 522, 524 and current applied to band(s) 502–510a proportional to input from turn sensor |
| High Beam, Fog and Turn | Current applied to bands 34, 36 and pulsating current applied to bands 502b–510b, patches 530 or sections 520, 522, 524 |
| High Beam, Fog and Cornering | Current applied to bands 32, 36 and current applied to band(s) 502–510a proportional to input from turn sensor |
| High Beam, Fog, Turn and Cornering | Current applied to bands 32, 36 pulsating current applied to bands 502b–510b, patches 530 or sections 520, 522, 524 and current applied to band(s) 502–510a proportional to input from turn sensor |

It is the preferred embodiment of the present invention that when the bulb 12 is extinguished, a current is applied to all three bands 32, 34, 36. This renders the liquid crystal material of the bands 32, 34, 36, turning bands 502b–510b, patches 530, sections 520, 522, 524 and/or cornering bands 502a–510a light transmissive for cosmetic purposes. Automotive companies spend much money on headlamp design every year to create cosmetically attractive bulb shields and practice of the invention helps in achieving an attractive appearance. An alternative option is to apply current to the liquid crystal bands only when the bulb 12 is illuminated. This would serve a cosmetic purpose so that a headlamp, taillamp, fog light could be rendered opaque when not illuminated and rendered light transmissive in a controlled manner across its surface when its associated lamp is on. As a still additional option, the liquid crystal regions can be rendered translucent when the motor vehicle is running regardless of the bulb condition.

So long as the controller 110 is powered up by a signal derived from the twelve volt signal from the motor vehicle battery, the controller 110 provides pulsed on/off signals at the two outputs 112a, 112b. These signals have a frequency of about 64 hertz and have a duty cycle of 50%. These pulses pass through high current inverter drivers 130 to a step up transformer 132. The step up transformer 132 has a center tap 134 coupled to the twelve volt output from the vehicle battery. The transformer produces an alternating square wave signal across two bus conductors 140, 142 that alternates back and forth between +40 volts and −40 volts at a frequency of 64 hertz.

As stated above, the programmable controller 110 also produces signals at outputs 112c, 112d, 112e, 112f, 112g, 112h for controlling a light transmissive characteristic of the bands 32, 34, 36, regions 50, cornering bands 502a–510a, turning bands 502b–510b, patches 530 and sections 520, 522, 524. These outputs from the controller 110 are 128 hertz, pulse width modulated, square waves. The width of the pulse determines the light intensity from the bulb 12 transmitted by an associated control element of coating material. Each of the outputs 112c, 112d, 112e, 112f, 112g, 112h is coupled to an associated optoisolator 150a, 150b, 150c, 150d, 150e, 150f through an inverting, high current drive amplifier 152. Consider the output 112c. When this output goes high, the inverter produces a low signal which turns on a light emitter of the optoisolator 150*a*. This in turn turns on a transistor of the optoisolator 150*a*, thereby transmitting the pulse to a bridge rectifier 160. The bridge rectifier acts as a valve to transmit the 64 hertz signal across the bus conductors 140, 142 across an associated control element.

The pulse width of the 128 hertz signal at the outputs 112*c*, 112*d*, 112*e*, 112*f*, 112*g*, 112*h* determines the light intensity of the light transmitting portions of the housing. The pulse width controls the on time of a bridge rectifier by switching the associate optocoupler on and off. This in turn determines a length of time that the 64 hertz signal from the transformer is applied to an associate liquid crystal coating member. A resistor 162 (10 k) and a capacitor 164 (1 microfarad) determining the rate at which the voltage can rise across the liquid crystal material. Given more time (wider pulse), the voltage will go higher and increase the light intensity transmitted through an associated control element such as one of the bands 32, 34, 36. Given less time (narrow pulse), the voltage will be lower and decrease the light intensity. The controller can control the pulse width in increments of 30 microseconds (0.000030 seconds) providing good resolution on light intensity control. In one exemplary embodiment, however, the coating material is either rendered essentially transparent due to application of the +/−40 volt signals from the transformer or is rendered opaque by blocking all signals from the transformer. The highly transparent state for the band 32, for example, is achieved by application of a constant high output signal at the output 112*c* from the controller 110. In accordance with alternate procedures, a dimming of the light transmission is achieved through pulse width modulating an output from the controller 110 with a controlled pulse width signal. Using the programming capability of the controller 110 it is possible to control a level of opacity of each individual liquid crystal band in order to optimize the headlamp assembly performance. The operating system of the controller 110 can be programmed with preset levels of opacity based upon the type of beam selected. For example, if may be that the optimum "low beam with fog" lamp combination emits a preferred amount of light by making the low beam liquid crystal band 34 20% opaque. This value can be programmed or adjusted depending on the configuration of the lamp assembly and is generally an empirically determined factor. It may also be possible to use a master dimming switch that controls the opacity of the three liquid crystal bands 32, 34, 36. Note, in this regard, the opacity of the patches 50 is constant so the dimming capacity noted above does not apply to these regions. An alternate method of energization uses a control over a Direct Current voltage level rather than a pulsing or alternating signal. In this embodiment the Direct Current applied to a liquid crystal region is varied to adjust the opacity of the liquid crystal region.

The bulb housing 14 is most preferably made from a front, light transmissive portion 16 that functions as a lens and an interior light reflecting surface 20. A rear wall 170 of the assembly 10 supports the bulb 12 in relation to the front, light transmissive portion so that when the bulb is energized to emit light those portions of the light transmissive portion 16 not blocked by sheets of opaque liquid crystal material transmit light to an illumination zone or region. Both the light transmissive and reflector sections 16, 20 are molded plastic parts. During assembly, the bulb 12 is mounted to the reflector section 20 and conductors for energizing the liquid crystal regions are attached to the reflector. The liquid crystal regions are attached to the light transmissive portion 16 of the housing. In the disclosed embodiment of the invention, the bands 32, 34, 36 are supported on an inner surface of the light transmissive section 16. The liquid crystal areas 50 are attached to an outer surface of the light transmissive section 16. The reflector section 20 is most preferably coated with a paint that enhances a light reflecting capacity of an inner surface of the section 20.

The programmable controller 110 most preferably is a microprocessor that receives a DC energization signal from a voltage regulator circuit (not shown) powered by a motor vehicle battery. The microprocessor is programmed with an operating system that periodically senses the status of the input switches and provides appropriate pulse width modulated outputs from the outputs 112*a*–112*h*. The use of a microprocessor adds flexibility to a manner in which the liquid crystal regions are activated. In certain instances such flexibility is not needed and a programmed logic array could be used to provide the input sensing and output signal control.

In the exemplary embodiment of the invention, there is no benefit to separate programming of the liquid crystal patches 50 for different activations of the three liquid crystal bands 32, 34, 36. However, the photometrics of a vehicle's headlamp depend upon the shape, height and overall dimensions of the car as well as the shape of the bulb housing's reflective surface which is dependent on each vehicle's front end design. Therefore, if some photometric points in front of the headlamp are necessary for a high beam but not a low beam, and if these points were affected by the low beam when it is operated without the high beam, the controller 110 can be programmed to only make the photometric point opaque in the high beam state by selective activation of the patches depending on the high beam/low beam status.

Photometric standards pursuant to 49 C.F.R. sec 571.108 (b) are tabulated below and indicate zones of coverage for the liquid crystal patches 50.

The controller is programmed in a manner to comport to the nature of the reverse mode liquid crystal material. Therefore, when one of the bands 32, 34, 36 or patches 50 is to be rendered highly light transmissive, the controller does not supply current to these areas. On the other hand, when one of the bands or patches is to be opaque, according to the status of the switch, the controller supplies current to this area. The same schematic depiction in FIG. 3, relating to the exemplary embodiment, applies to the disclosed alternative embodiment, however, the microprocessor outputs based on the control signals coming from the switch 100 are determined based on the nature of the reverse mode liquid crystal material.

The alternative embodiment also contemplates that when the bulb 12 is extinguished, current is not applied to all three bands 32, 34, 36. This renders the reverse mode liquid crystal material of bands 32, 34, 36 light transmissive for cosmetic purposes. The reverse mode liquid crystal material allows the bands 32, 34, 36 to be light transmissive when the motor vehicle is not running. Since no current is applied to the reverse mode liquid crystal material, use of this material eliminates the need for supplying current to the lamps when the motor vehicle is not running.

The circuit also includes an input 115 which can be used as a dimmer control. The microprocessor 110 is programmed to accept the input 115 from the dimmer control to adjust the light output accordingly.

As noted above, the controller disclosed in the alternative embodiment operates in the same manner as the controller disclosed in the exemplary embodiment. The use of the reverse mode liquid crystal material in the alternative embodiment requires current to render the bands 32, 34, 36 and patches 50 opaque and no current to render these areas light transmissive. The microprocessor operating system determines whether or not current is applied based on inputs from the switch 100 while all other aspects relating to FIG. 3 remain the same. Reverse mode liquid crystal material may also be applied employed in the turning and cornering functions. The controller 110 can be programmed based on the type of material used. A reverse mode liquid crystal material that is clear in the undriven state and is opaque when energized is commercially available from Merck Liquid Crystals under the trade designation Licrilite. (Registered Tradmark).

TABLE 2

Photometric Test Point Values
for Mechanical Aim Headlighting Systems
UPPER BEAM

| Test Points (degrees) | Candela Maximum | Candela Minimum |
|---|---|---|
| 2U-V | — | 1,500 |
| 1U-3L and 3R | — | 5,000 |
| H-V | 75,000 | 40,000 |
| H-3L and 3R | — | 15,000 |
| H-6L and 6R | — | 5,000 |
| H-9L and 9R | — | 3,000 |
| H-12L and 12R | — | 1,500 |
| 1.5D-V | — | 5,000 |
| 1.5D-9L and 9R | — | 2,000 |
| 2.5D-V | — | 2,500 |
| 2.5D-12L and 12R | — | 1,000 |
| 4D-V | 12,000 | — |

TABLE 3

Photometric Test Point Values
for Mechanical Aim Headlighting Systems
LOWER BEAM

| Test Points (degrees) | Candela Maximum | Candela Minimum |
|---|---|---|
| 10U–90U | 125 | — |
| 4U-8L and 8R | — | 64 |
| 2U-4L | — | 135 |
| 1.5U-1R to 3R | — | 200 |
| 1.5U-1R to R | 1,400 | — |
| 1U-1.5L to L | 700 | — |
| 0.5U-1.5L to L | 1,000 | — |
| 0.5U-1R to 3R | 2,700 | 500 |
| H-4L | — | 135 |
| H-8L | — | 64 |
| 0.5D-10.5L to L | 3,000 | — |
| 0.5D-1.5R | 20,000 | 10,000 |
| 1D-6L | — | 1,000 |
| 1.5D-2R | — | 15,000 |
| 1.5D-9L and 9R | — | 1,000 |
| 2D-15L and 15R | — | 850 |
| 4D-4R | 12,500 | — |

TABLE 4

Photometric Test Point Values
for Visual/Optical Aim Headlighting Systems
UPPER BEAM

| Test Points (degrees) | Candela maximum | Candela Minimum |
|---|---|---|
| 2U-V | — | 1,500 |
| 1U-3L and 3R | — | 5,000 |

TABLE 4-continued

Photometric Test Point Values
for Visual/Optical Aim Headlighting Systems
UPPER BEAM

| Test Points (degrees) | Candela maximum | Candela Minimum |
|---|---|---|
| H-V | 75,000 | 40,000 |
| H-3L and 3R | — | 15,000 |
| H-6L and 6R | — | 5,000 |
| H-9L and 9R | — | 3,000 |
| H-12L and 12R | — | 1,500 |
| 1.5D-V | — | 5,000 |
| 1.5D-9L and 9R | — | 2,000 |
| 2.5D-V | — | 2,500 |
| 2.5D-12L and 12R | — | 1,000 |
| 4D-V | 12,000 | — |

TABLE 5

Photometric Test Point Values
for Visual/Optical Aim Headlighting Systems
LOWER BEAM

| Test Points (degrees) | Candela maximum | Candela Minimum |
|---|---|---|
| 10U–90U | 125 | — |
| 4U-8L and 8R | — | 64 |
| 2U-4L | — | 135 |
| 1.5U-1R to 3R | — | 200 |
| 1.5U-1R to R | 1,400 | — |
| 1U-1.5L to L | 700 | — |
| 0.5U-1.5L to L | 1,000 | — |
| 0.5U-1R to 3R | 2,700 | 500 |
| H-4L | — | 135 |
| H-8L | — | 64 |
| 0.6D-1.3R | — | 10,000 |
| 0.86D-V | — | 4,500 |
| 0.86D-3.5L | 12,000 | 1,800 |
| 1.5D-2R | — | 15,000 |
| 2D-9L and 9R | — | 1,250 |
| 2D-15L and 15R | — | 1,000 |
| 4D-4R | 12,500 | — |
| 4D-20L and 20R | — | 300 |

Figure 2A:
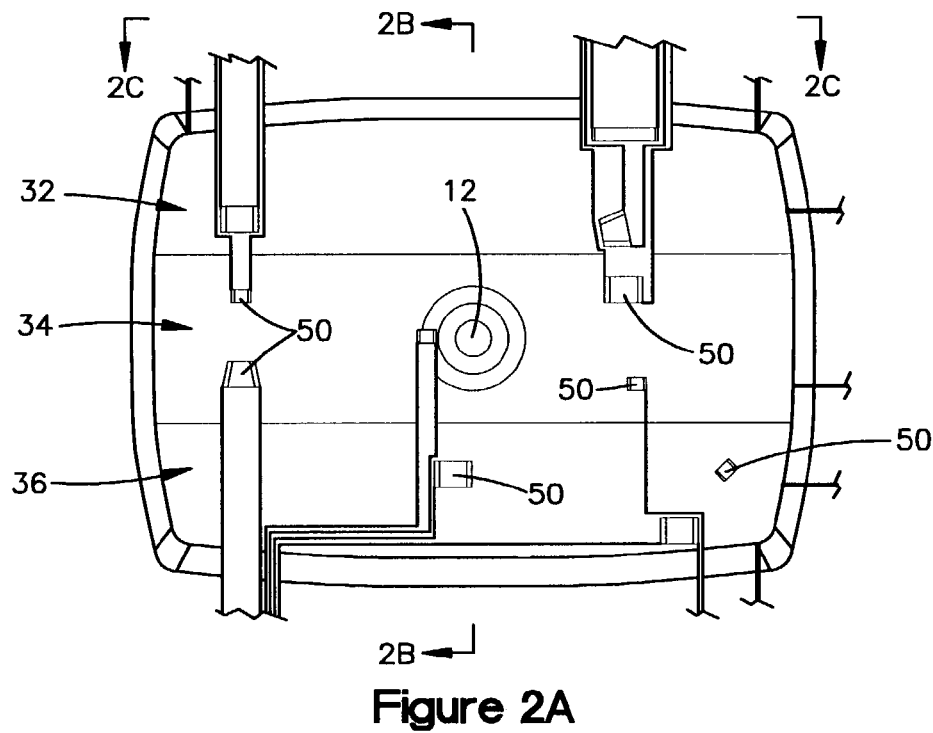
FIGS. 2A, 2B and 2C are front plan, side plan, and section views of a headlamp housing that forms part of the FIG. 1 assembly.
Figure 2B:
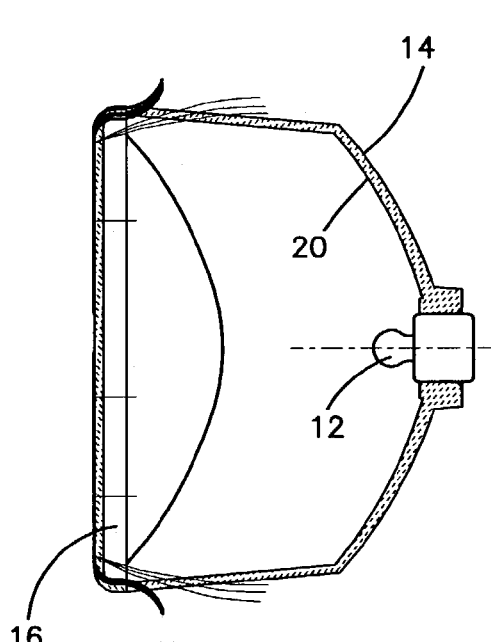
Figure 2C:
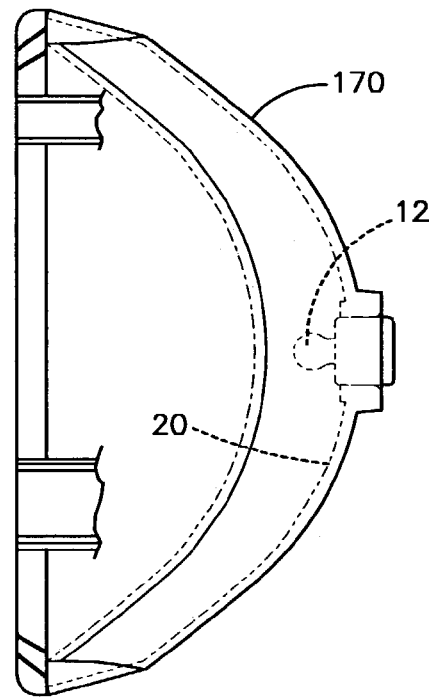
Figure 4:
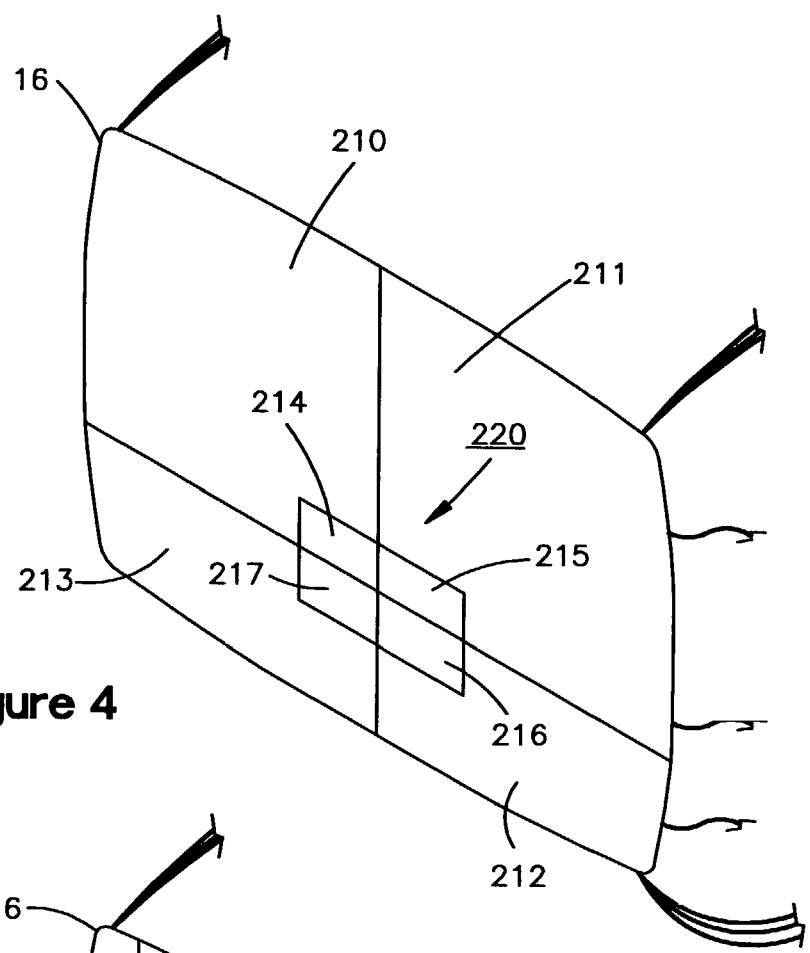
FIG. 4 is a first alternate depiction of a headlamp assembly constructed in accordance with the invention
Figure 5:
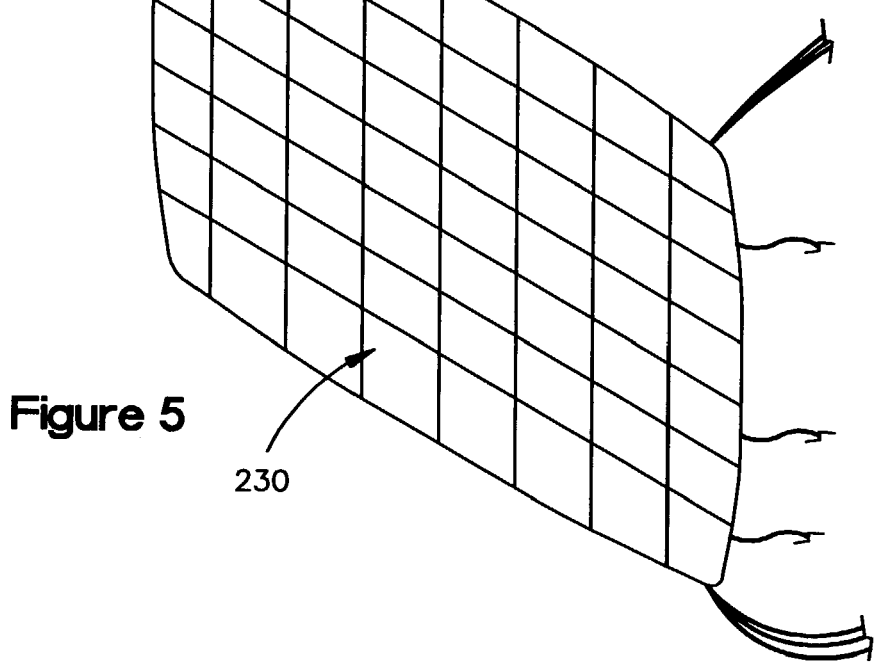
FIG. 5 is a second alternate depiction of a headlamp assembly constructed in accordance with the invention.

FIGS. 4–6 depict alternate liquid crystal film patterns for use with headlamps constructed in accordance with the invention. In FIG. 4, the front, forward facing light transmissive portion 16 of the housing is coated with eight separate liquid crystal regions 210–217 which cover an entire front surface of the housing 14. These regions 210–217 are independently energized to adjust the light output from the headlamp assembly 10. As seen in FIG. 4, four regions 210–213 cover the entire front light transmitting surface or lens with the exception of a 'hole' or center region 220 made up of four center regions 214–217. The hole 220 is located at a region on the lens 16 at which the optics of the reflector 20 (FIG. 2B) concentrates the field of light to a 'hot spot'. By placing the multiple regions 214–217 over the hot spot and individually controlling their opacity, the shape and intensity of the light emitted through the hole 220 onto the road is controlled. Rendering the regions 210–213 outside the hole 220 opaque eliminate any glare from side angles to oncoming motorists.

FIG. 5 depicts the use of a multiple liquid crystal regions to create a grid 230 on the lens 16. This embodiment would give a greater degree of control of light being emitted from any region of the lens 16. As an example, if there is a horizontal cut-off above or below which no light is to be emitted the segments of the grid above or below that cutoff could be controlled to remain opaque and thereby prevent light from being emitted through those regions. In either the FIG. 4 or the FIG. 5 embodiment of the invention, the programmable controller can be programmed to pulse a quadrant of the liquid crystal material on the bulb housing at a regular frequency so that it is rendered light opaque and then light transmissive with a fifty percent duty cycle. This pulsed operation simulates a turn signal and would eliminate the need for a turning signal separate from the housing.

FIG. 6 depicts a third alternate array 232 of multiple regions attached to a front surface of a lens 16. This embodiment includes multiple bands of liquid crystal material that extend across the width of the headlamp. One particular band 234 includes multiple smaller segments or regions of liquid crystal material to give a greater degree of control over the light transmitting characteristics of the lens 16.

In certain bulb housing designs, the distance from the light source or bulb 12 to the lens 16 may be a short enough distance so that the lens temperature reaches or exceeds the operating limits of the liquid crystal film adhering to the lens. To deal with this potential problem the distance between the bulb 12 and the liquid crystal regions can be extended by use of a cap 240 (FIG. 8) that fits over the front of the lens 16. An array of one or more selectively light transmitting liquid crystal regions 242 are applied to an inner surface of a front light transmissive panel 244 of such a cap 240. In this alternate embodiment (FIG. 8) the liquid crystal film is spaced from an outer surface of the lens by an air gap 246 that adds separation between the bulb 12 and the liquid crystal materials supported by the cap 240. This added separation maintains the temperature of the liquid crystal materials within safe operational temperatures. Air circulation in the region of the liquid crystal materials is achieved by venting through a plurality of slots 248 along a side of the cap 240.

FIG. 7 illustrates an alternative use of the present invention. This figure depicts a tail lamp 250 schematically showing both a brake light 252 and a backup light 254. A taillamp lens 260 faces outward away from a vehicle body. The lens supports an array 262 of one or more liquid crystal regions attached at selected locations across an inner surface. Wires 264 for selectively controlling the light transmissive characteristics of the array of liquid crystal regions are routed along an outside surface of the tail lamp 250 to a wiring harness 266 that activates the brake and backup lights. Although the disclosed tail lamp 250 includes brake and backup lights, a similar construction can be used with a tail lamp having only a single tail light and as mentioned previously such a lamp can include a control for simulating a turn signal rather than turning on and off the bulb.

In an alternative embodiment of the present invention, reverse mode liquid crystal is used as the coating material. Reverse mode liquid crystal material operates in a manner opposite to the liquid crystal material disclosed in the exemplary embodiment. When current is applied to the reverse mode liquid crystal material the material is rendered more opaque, on the other hand, when no current is applied, the material is rendered more light transmissive.

As noted above, FIG. 1 illustrates a headlamp assembly 10 that includes a headlamp bulb 12 for emitting light that is mounted to a bulb housing 14 having a light transmissive portion or lens 16 for emitting light from the headlamp bulb 12 to an illumination zone in front of the headlamp assembly 10. An interior surface 20 of the light bulb housing 14 reflects light reaching the surface 20 back into the housing interior so that it will exit the housing through the light transmissive portion 16.

The light transmissive portion 16 of FIG. 1 is coated at specified regions with a coating material. In the alternative embodiment, when these regions are electrically energized the coating material is rendered more opaque to block more light from passing through the coating material, whereas when the regions are not electrically energized, the coating material is more light transmissive. A drive circuit 30 (see FIG. 3) is electrically coupled to the regions of coating material and thereby controls a light output from the headlamp assembly.

Similar to the exemplary embodiment, in the alternative embodiment of the invention the light transmissive portion of the housing is coated with three bands 32, 34, 36 of the coating material. These bands are independently energized to adjust the light output from the headlamp assembly 10. The headlamp assembly 10 is for a motor vehicle. The opacity of the three bands 32, 34, 36 of coating material are selectively controlled to adjust the opacity of the three bands thereby producing a high beam output, a low beam output and a fog lamp output, respectively, from the headlamp assembly 10. In addition to the three bands 32, 34, 36, the disclosed alternative embodiment of the invention includes a plurality of smaller regions 50 of coating material that are coupled to the drive circuit 30 by means of conductors 52 routed across the light transmissive portion of the housing. Both the bands 32, 34, 36 and additional smaller regions or patches 50 are most preferably built using cut to size sheets of a reverse mode liquid crystal material. The coating material in the alternative embodiment may be affixed in a similar manner as disclosed in the exemplary embodiment.

The patches 50 are solely for photometric purposes and are not under the direct control of the motorist. The patches are rendered opaque at any time that the headlamp bulb 12 is outputting light to create a field of illumination which is in accordance with governmental photometric standards. When the headlamp bulb 12 is not producing light, there is also no current being applied to the patches 50 so that the patches are rendered light transmissive.

In another embodiment of the present invention, a dye is incorporated into the coating material that covers the light transmissive portion 16 of the light bulb housing 14 in the headlamp assembly 10 of FIG. 1. Preferably, dichroic dye is added to the liquid crystal coating material in order to provide color to the liquid crystal film covering the light transmissive portion 16 of the headlamp assembly 10. The dichroic dye can be incorporated into either the standard liquid crystal material or the reverse mode liquid crystal material. In general, dichroic dyes comprise dye molecules that are generally a rod shaped configuration. These molecules align themselves parallel with the direction of the liquid crystal material and an electric field is applied to control the alignment of the dye molecules. In the presence or absence of an electric field, the dye molecules can take on the appearance of being either colored or transparent. By altering the electric field, the dye molecules can be converted from a transparent state to a colored state and visa versa.

The type of dichroic dye can be selected to correspond to the type of coating material being used, i.e. standard liquid crystal material or reverse mode liquid crystal material. In the case where the standard liquid crystal coating material is used, an absence of electric current renders the standard liquid crystal material more opaque. When a dye is incorporated into the standard liquid crystal material, the appearance in the absence of electric current is rendered more colored and opaque. The color will depend on the type and color of the dye selected. When electric current is applied to the standard liquid crystal material, the material takes on a transparent appearance, thus allowing the transmission of light. Therefore, standard dyed liquid crystal material will take on a more clear (non-colored) light transmissive appearance or a colored light transmissive appearance.

With respect to reverse mode liquid crystal material, a dye is selected that is consistent with the physics of the reverse mode liquid crystal material. When no electric current is applied to the dyed reverse mode liquid crystal material, the material takes on a more clear (non-colored) light transmissive appearance or a colored light transmissive appearance. When electric current is applied to the dyed reverse mode liquid crystal material, the reverse mode material takes on a more colored opaque appearance. For both types of liquid crystal materials, the degree of color and/or opacity is proportional to the amount or absence of electric current being applied to the material. Thus, the light transmissive portion 16 of the headlamp assembly 10 in FIG. 1 can be rendered in different states of color and/or opacity depending on different combinations of dye type, coating type and electric current.

Dyed liquid crystal material can be used in place of non-dyed liquid crystal material in any of the preceding embodiments for the purpose of coloring a headlamp, tail lamp, fog lamp, etc. The dye color can be selected to either match or contrast the color of the vehicle for cosmetic purposes. In addition, dyes can be selected to provide for different colors of light being emitted from the light transmissive portion of the headlamp assembly. Dichroic dyes can be incorporated into the liquid crystal material in any fashion known to those of ordinary skill in the art in view of this disclosure. The dyes normally are sold in powdered form and are commercially available from Mistu Toatsu Senyro Company.

Figure 10:
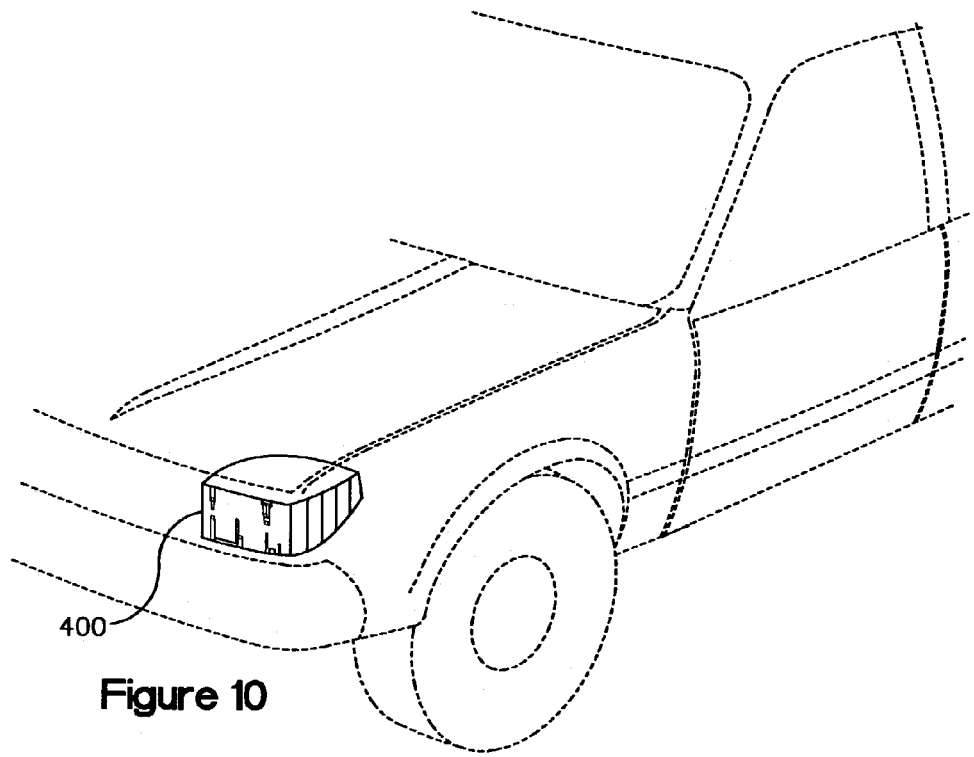
FIG. 10 depicts an automobile with a headlamp according to the present invention.
Figure 11:
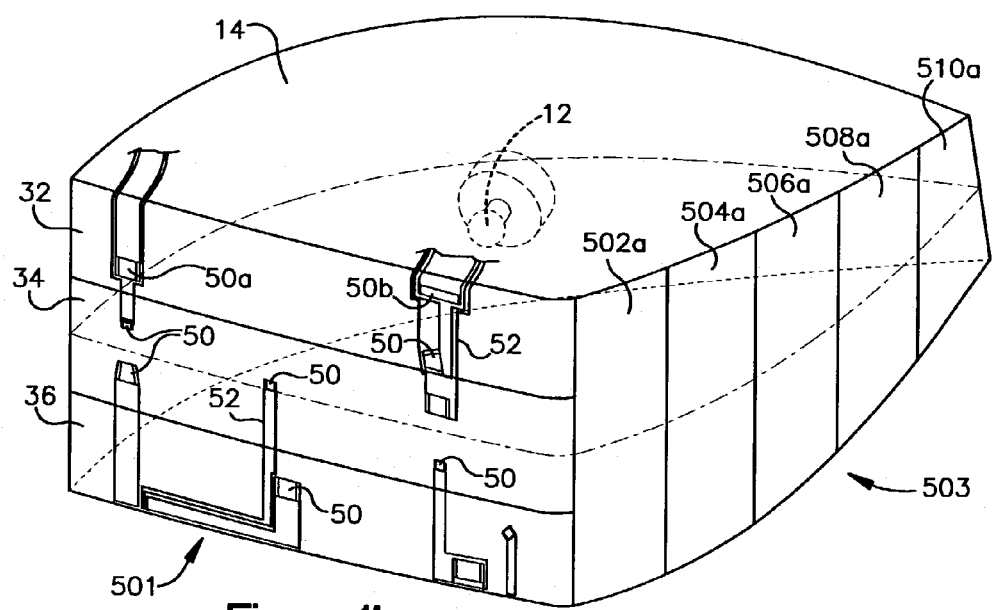
FIG. 11 is a perspective view of a headlamp constructed in accordance with the present invention
Figure 12:
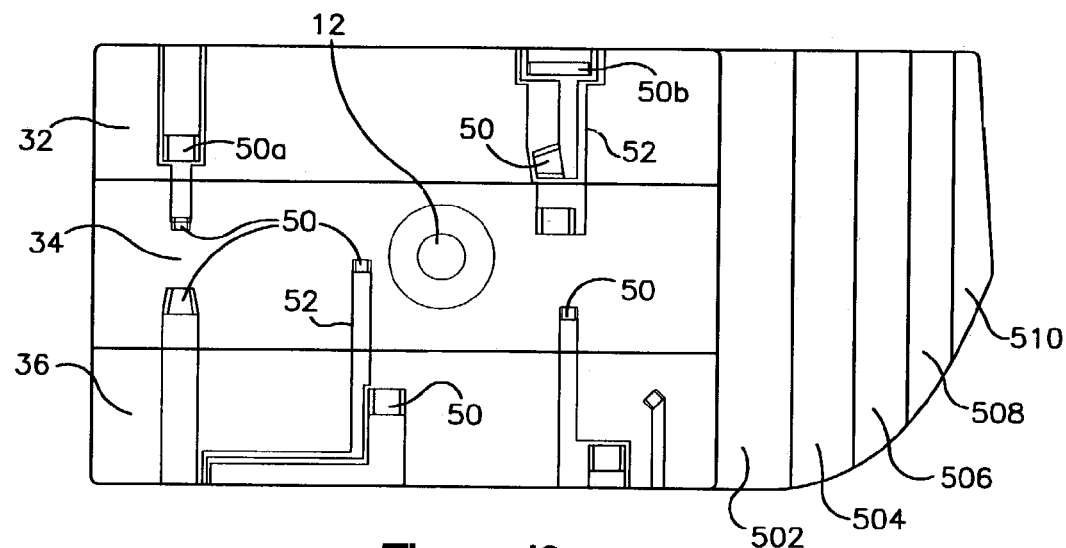
FIG. 12 is a front view of a headlamp constructed in accordance with the present invention.

In yet another embodiment of the invention, the headlamp incorporates side lighting to illuminate a second illumination zone in the direction of turn of the vehicle yet still illuminating a zone in the front of the vehicle. FIG. 10 shows the front of a vehicle with a headlamp 400 according to this embodiment. FIGS. 11 and 12 show a headlamp having a front light transmissive portion consistent with the exemplary embodiment of the invention. The headlamp of FIGS. 11 and 12 additionally includes a second light transmissive portion (shown generally as reference number 503) being coated with a series of vertical bands 502a, 504a, 506a, 508a and 510a. Five bands are shown but more or less bands may be used in view of the instant disclosure. The vertical bands are independently energized by a drive circuit (see FIG. 3) to adjust the light output from the headlamp assembly to a second illumination zone. The second illumination zone is located in the direction of turn of the vehicle.

The opacity of the vertical bands is selectively controlled to adjust the light transmissive properties thereby providing illumination to the second illumination zone in the direction of turn of the vehicle. The selective control operates to adjust the amount of light output to the second illumination zone in proportional to the degree of turn of the vehicle. For example, in the case of FIG. 12, five vertical bands 502a, 504a, 506a, 508a and 510a are employed. When the driver is making a turn that is 20% of the maximum turn for the vehicle, 20% of the available bands will go from a opaque state to a more light transmissive state or in the case of FIG. 12, band 502a will become more light transmissive and bands 504a, 506a, 508a and 510a will retain their opaque state. When the driver is making a turn that is 100% of the maximum turn for the vehicle, all the bands 502a, 504a, 506a, 508a and 510a take on a more light transmissive state thereby illuminating the second illumination zone. The vertical bans 502a, 504a, 506a, 508a and 510a can be rendered more light transmissive dependent on the degree of turn in any number of combinations dependent on the programmable circuit depicted in FIG. 3. In the instance where only one band is employed, the band can take on a more light transmissive state upon any degree of turn.

The liquid crystal material applied to the vertical bands 502a, 504a, 506a, 508a and 510a can be affixed to the light transmissive portion 501 by any means consistent with this disclosure or as know to one of ordinary skill in the art in view of this disclosure. In addition, the vertical bands 502a, 504a, 506a, 508a and 510a are connected to the programmable circuit by any means consistent with this disclosure or as know to one of ordinary skill in the art in view of this disclosure.

The side-lighting embodiment of the present invention can employ regular or reverse-mode liquid crystal material. The programmable circuit is thus programmed based on the type of liquid crystal material being used. In addition, dichroic dyes consistent with this disclosure can be incorporated into the liquid crystal material of the side-lighting feature for any reason including cosmetic appearance and other headlamp functions such as a turning signal.

The headlamp also includes a headlamp bulb 12. Preferably, the bulb is a single dual filament light source. In either case, the cornering bands 502a, 504a, 506a, 508a and 510a maintain the same light intensity regardless of the light function of the first illumination zone by programming the drive circuit. For example, when the first illumination zone is in high beam mode, the circuit may be programmed to account for the intensity of the high beam output by adjusting the opacity of the bands. Likewise when first illumination zone is in low beam mode, the circuit will allow decrease the opacity of the bands to allow more light through. In this manner, the cornering intensity can be maintained regardless of other light functions being employed.

Figure 13:
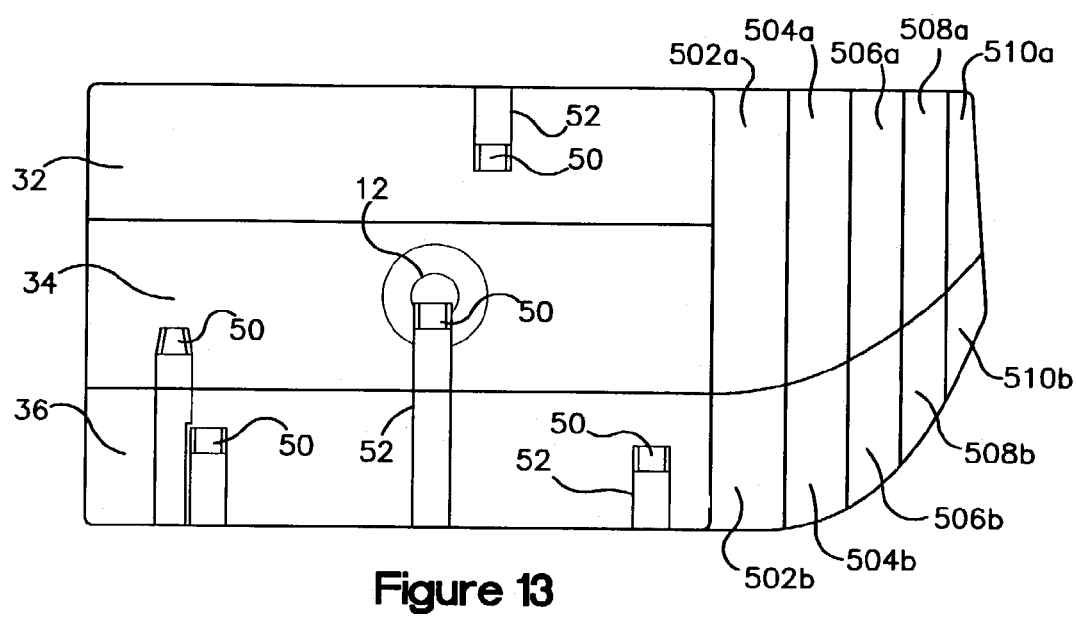
FIG. 13 is a front view of a headlamp constructed in accordance with the present invention

FIG. 13 shows the inventive headlamp with the inclusion of a turning function on the second light transmissive portion of the headlamp. The second light transmissive portion includes multiple vertical bands 502a & b, 504a & b, 506a & b, 508a & b and 510a & b. Vertical bands 502a–510a covering approximately a top two thirds of the second light transmissive portion and are used for cornering light during vehicle turns. As is consistent with this disclosure, the vertical bands 502a–510a may be rendered more light transmissive in proportion to the degree of turn of the vehicle. Vertical bands 502a–510a communicate with the programmable circuit as disclosed and comprise liquid crystal material.

Vertical Bands 502b–510b cover approximately the bottom one-third of the second light transmissive portion and are covered by two pieces of stacked liquid crystal material. Each piece of liquid crystal material communicates with the drive circuit to produce a variety of different light functions being transmitted to the second illumination zone. While simultaneously providing turning illumination, a turning signal may also be employed. This is accomplished through the stacked liquid crystal material in bands 502b–510b. The stacked liquid crystal material allows the second light transmissive portion to produce turning light and turning signal or running light at the same time.

For example, in a turning situation, bands 502a–510a will provide turning light in proportion to the degree of turn as previously disclosed. Simultaneously, bands 502b–510b provide turning signal through the use of stacked liquid crystal material. Not all of bands 502b–510b are needed to supply the turning signal. Only enough bands to meet the minimum requirements for turning signal are necessary. Bands 502b–510b which are not used for the turning signal may be used for other headlamp functions.

In the stacked bands 502b–510b, two pieces of liquid crystal material are used to provide different functions to the second illumination zone. One piece of liquid crystal material in each band changes from a clear light transmissive state to a more opaque state depending on the amount of current applied to that piece and the function being performed. The other piece may incorporate a dichroic dye, which can alter the color of the light being illuminated to the second light transmissive zone. This piece of material changes from the clear dyed state to a more opaque dyed state depending on the amount of current being applied and the headlamp function being performed. For example, when turning, the stacked bands 502b–510b will have one piece of liquid crystal material changes from an opaque state to a clear state while the other piece of liquid crystal material changes from a clear yellow-dyed state to a more opaque state. These functions will alternate thus producing a "blinking" output of the turn signal.

Figure 14:
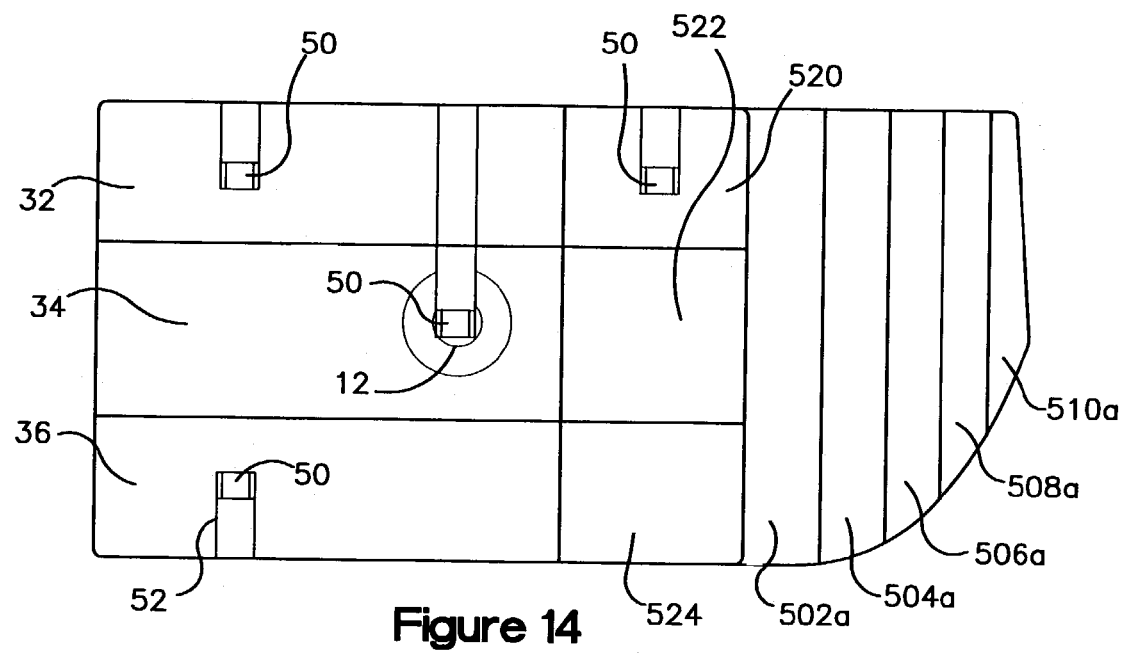
FIG. 14 is a front view of a headlamp constructed in accordance with the present invention.
Figure 15:
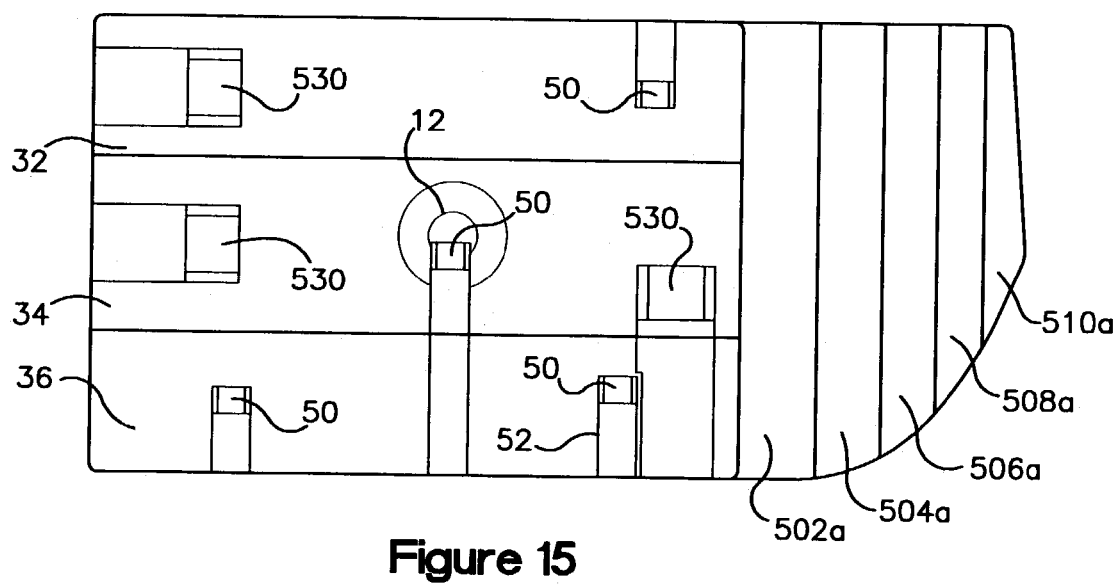
FIG. 15 is a front view of a headlamp constructed in accordance with the present invention.

FIGS. 14 and 15 show alternate ways of employing the turn function with the coming function. In FIG. 14, the turning signal is located on the first light transmissive portion. The turning signal operates in a vertical band including three sections 520, 522, 524 each having two pieces of stacked liquid crystal material. One piece of the stacked liquid crystal material in sections 520, 522 and 524 alternates between a clear state and an opaque state depending on the current supplied from the drive circuit. The second piece of the stacked liquid crystal material includes a dye for the coloring of the turning signal. This piece alternates between a clear dyed state and a clear state depending on the current and function output of the drive circuit. Section 520 includes photometric patch 50. The amount of light being illuminated from section 520 may be adjusted independent of the other sections 522, 524 such that the illumination does not exceed the regulated output for photometric patch 50. When no turning function is being applied, the sections 520, 522 and 524 take on a clear state to illuminate the first illumination zone as part of the headlamp functions consistent with other embodiments of the disclosure.

In FIG. 15, the turning signal is likewise on the first light transmissive portion. The turning function is accomplished through three large patches 530 of stacked liquid crystal material located at predetermined areas on first light transmissive portion of the headlamp. Although only three are shown, more or less patches may be used as know to those of ordinary skill in the art in view of this disclosure. The stacked material operates in a manner as previously stated in this disclosure.

Figure 16:
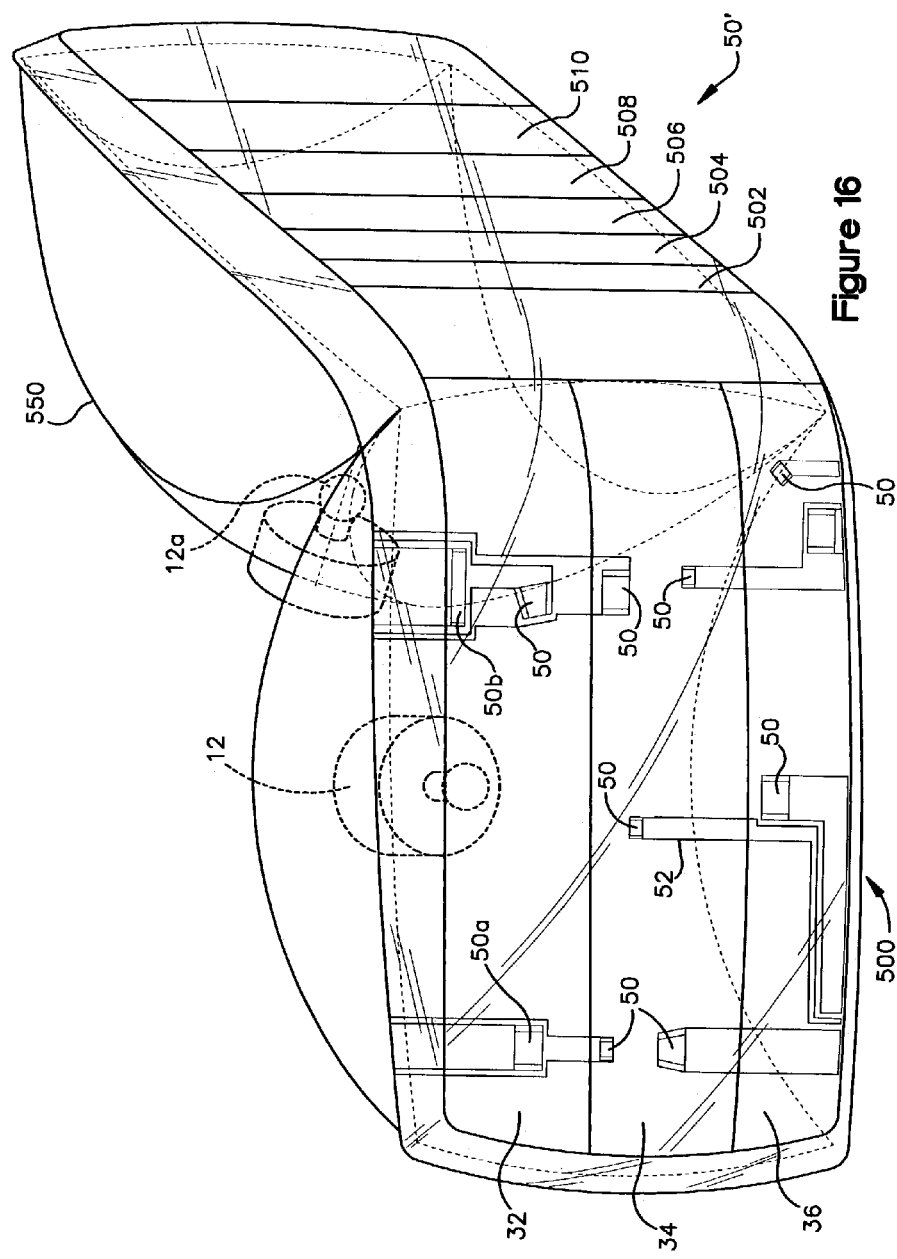
FIG. 16 is a perspective view of a headlamp constructed in accordance with the present invention.

Referring now to FIG. 16 a headlamp providing coming light is shown with a first light source 12 which illuminates the first illumination zone and a second light source 12a which illuminates a second illumination zone. As disclosed, the light sources can be any source as know to those of skill in the art. Bulb 12 illuminates the first illumination zone through the first light transmissive portion and bulb 12a illuminates the second illumination zone through the second light transmissive portion. In the preferred embodiment, the second light source 12a is of less intensity than the first light source 12 since the lighting for the second illumination zone does not require as intense of a light source. Of the two light sources, at least one is a dual filament design.

The first light transmissive portion includes three bands 32, 34, 36 which when energized alter the amount and function of the light emitted to the first illumination zone consistent with this disclosure. The second light transmissive portion includes vertical bands 502a–510a which provide light to the side of the vehicle in proportion to the degree of turn of the vehicle as is consistent with this disclosure. Although only five bands are shown, any number of bands may be employed as known to those of skill in the art in view of this disclosure. The bands 502a–510a may also include portions of stacked liquid crystal material such that multiple headlamp functions can be performed as previously disclosed. The housing 550 is constructed to allow for a two-bulb application.

The cornering headlamps according to the present invention may be used in conjunction with or in place of advanced front lighting systems (AFS). AFS help improve visibility and driver awareness at night and in bad weather. The AFS operates through automatically adapting a vehicles lights in response to direction, speed, driver's actions, road conditions and location (i.e., town, country, motorway, etc.). Sensors, such as a turning sensor, monitor the cars parameters such as vehicle speed and steering angles to assure the proper distribution and control of the lights. A programmable controller process data and activities from the sensors and changes the light output to adjust to the constantly changing driving conditions. In the instant case, the sensors are inputs 115 to the programmable circuit which will change the output light distribution as disclosed. One of ordinary skill in the art would be able to ascertain how to use the programmable circuit to adapt the present invention to such an application in view of the disclosure.

The cornering light embodiments may also employ the reverse-mode liquid crystal as described. The differences in the liquid crystal can be programmed into the programmable circuit to account of any differences in operation. In addition to reverse mode liquid crystal, twisted nematic (TN) or other types of liquid crystal can be employed to block, scatter or redirect light according to the present invention. Again, the differences in the type of material used are accounted for in the programmable circuit. Photometric test points, as disclosed, may employ polarizing filters or other high contrast liquid crystals. In certain photometric test points, a high lumen output may be placed next to a low or no lumen output. By using patches of liquid crystal with high contrast values, the photometric test points may be satisfied.

In any of the above contemplated designs, a portion of the first light transmissive portion housing high beam, low beam and fog may be made more opaque during cornering light to reduce glare affecting oncoming motorists during a turn. This is accomplished via the programmable circuit.

Figure 17:
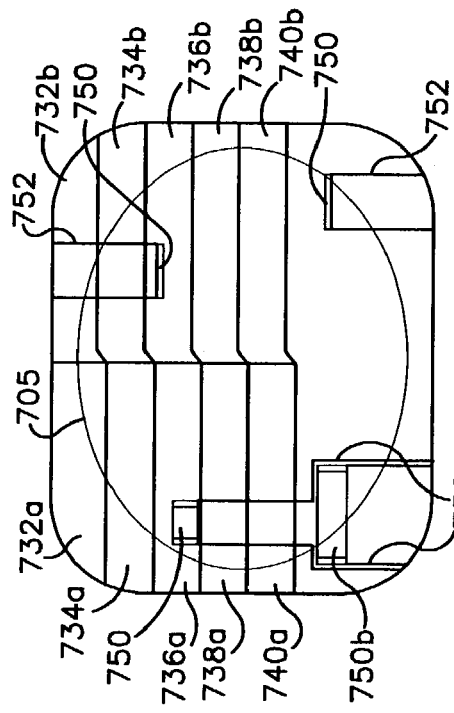
FIG. 17 is a cross-sectional view of a rear-projection headlamp according to the present invention.

In yet another embodiment, the present invention can be incorporated into a rear-projection headlamp. Turning now to FIG. 17, the rear projection headlamp includes a light source 701 positioned in a light source enclosure 703. The enclosure 703 also contains a focusing lens 705 positioned a distance away from the light source 701. Preferably, the lens 705 is positioned at a distance to maximize the light output of the light source 701. The enclosure 703 also includes a protective clear lens cover 709 which protects the lens 705 from the environment. The internal surface 711 of the enclosure is coated with a reflective material which reflects light emitted from the light source 701 back towards and through the lens 705 exiting the assembly through the clear protective cover 709. The cover 709 includes liquid crystal material that when energized alters that light being emitted from the assembly.

Figure 18:
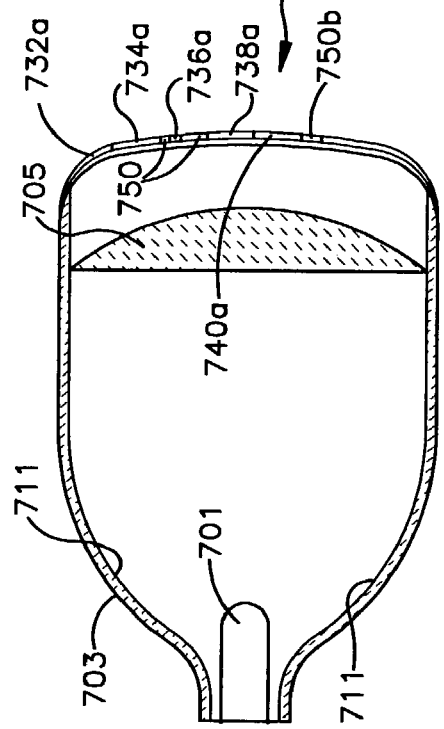
FIG. 18 is a front view of the headlamp as shown in FIG. 17.

FIG. 18 is a front view of the assembly of FIG. 17. The cover portion 709 includes a plurality of horizontal bands 732a &b, 734a & b, 736a & b, 738a & b and 740a & b. The horizontal bands are preferably comprised of liquid crystal material and coupled to the drive circuit 30 such that the properties of the light emitted from the assembly can be altered. The liquid crystal material used can be any liquid crystal material as know to those of skill in the art, including regular mode, reverse mode, beam steering, light scattering and high contrast. In addition to the horizontal bands, the cover 709 also includes a plurality of smaller regions 750 of the material that are coupled to the drive circuit 30 by means of conductors 752 routed across the cover 709. Additional patches 750, one shown, may also be employed as additional test points. The photometric patches operate consistent with the other photometric patches disclosed in this specification. In cases where a high lumen output point is located next to a low or no lumen output point, polarizing filters or other high contrast liquid crystal material may be employed to satisfy the test points in present embodiment or any other embodiment of the present invention. The bands may also incorporate dyed liquid crystal materials polarizing filter along with liquid crystal dyed with dichroic dye made be used to meet contrast levels between the on and off state for a particular band. In such case, the liquid crystal structure would match the orientation of the polarizing filter in the off state, and un-align in the on state giving the desired contrast levels. The types of liquid crystals used may be any liquid crystal known to those of ordinary skill in the art including twisted nematic. The v used for either the horizontal bands or smaller regions can be affixed to the cover 709 in any manner consistent with this disclosure.

The drive circuit as shown in FIG. 3 may be adapted by those of ordinary skill in the art in view of this disclosure to operate the horizontal bands 732a &b, 734a & b, 736a & b, 738a & b and 740a & b. The microprocessor 110 can be programmed such that outputs 112a–112h control the light altering characteristics of the liquid crystal material located in bands 732a &b, 734a & b, 736a & b, 738a & b, 740a & b and test patches 750 and 750b. When the rear projection light assembly is in use, unnecessary circuit functions can be disabled. For instance, where headlamp cornering function is not desired, the microprocessor is programmed such that the cornering contact 100e and turn sensor 111 are deactivated.

The horizontal bands 732a &b, 734a &b, 736a & b, 738a & b and 740a & b provide a horizontal cutoff point where light emitted from the assembly is blocked, scattered or redirected to a more desired location. For instance, when the low-beam application is being employed, instead of the v material making up the horizontal bands blocking or scattering light that would otherwise be directed toward oncoming motorist, the liquid crystal material redirects the light to the desired low-beam illumination zone. In this manner, light output from the light source is maximized and heat build-up in the assembly is reduced.

The microprocessor includes input 115 which may be used to link external sensors to the microprocessor to change the light output of the assembly based on different driving conditions. Preferably, the sensors include photosensors or inclination sensors. Other sensors may also be employed as apparent to those of ordinary skill in the art in view of this disclosure. Inclination sensors may be employed with a rear projection assembly that uses high-intensity discharge lamps as the light source. These inclination sensors monitor the inclination level of the car upon cresting a hill. When the inclination is such that light output will be directed to an undesired the microprocessor 110 recognizes the input and activates or deactivates the horizontal bands 732a &b, 734a & b, 736a & b, 738a & b and/or 740a & b to redirect, scatter or block the light from being emitted to the undesired location. The same also applies to the use of photosensors. Photosensors indicated the presence of another car and will send a signal to the microprocessor 110 through input 115 to adjust light output that would otherwise be aimed to undesired locations.

Any of the horizontal bands 732a &b, 734a & b, 736a & b, 738a & b or 740a & b may comprise two or more layers of stacked liquid crystal material. All of the layers of liquid crystal material are coupled to the drive circuit. As noted, the drive circuit can be programmed to alter the outputs based on the types of liquid crystal material and the function being performed as apparent to those of ordinary skill in the art in view of this disclosure. The stacked liquid crystal material can be used to accomplish different headlamp assembly functions. All headlamp functions can be accomplished through the use of stacked liquid crystal material. For example, any one or more of horizontal bands 732b, 734b, 736b, 738b and 740b may include a second layer of liquid crystal material. This second layer may be adapted to provide for a turning signal while at the same time any one of horizontal bands 732a, 734a, 736a, 738a and 740a may be performing a different function, such as fog, running or low beam. The stacked material operates in a manner consistent with other embodiments of this disclosure, including the use of dyes in the liquid crystal material to meet the any color requirements.

Figure 18A:
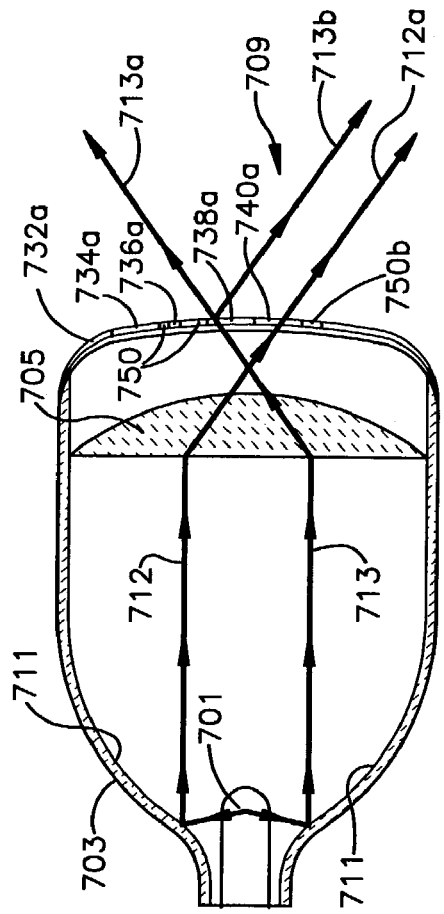

FIG. 18a shows the headlamp of FIGS. 17 and 18 in operation. This illustration shows the headlamp redirecting light beams in a low-beam application. Although only the low-beam application is shown, any headlamp application can use the beam steering capabilities as shown. The light source 701 emits beams 712 and 713. The beams 712 and 713 are reflected by the reflective coating material on the internal surface 711 of the headlamp back towards the optic lens 705. The beams 712 and 713 transmit through the lens 705 and are inverted. Beam 713 is inverted to an upper light field and beam 712 is inverted downward to a lower light field. Beam 712 exits the headlamp assembly through liquid crystal band 740a of the light transmissive portion 709. Since the beam 712 is heading towards the low beam field, the beam direction is not altered by the liquid crystal material. However, beam 713 is directed to an upper light field outside of the low beam illumination zone. Beam 713a shows where the beam the beam direction if not altered by the liquid crystal material in section 738a. If this beam 713a is allowed to continue, it may blind oncoming motorists. Therefore, section 738a is activated to redirect the beam 713b to the proper low beam illumination zone. This increases the light output to the low beam illumination zone by maximizing the use of the light emitted from the light source. The beam steering application can also be applied to all headlamp applications including but not limited to cornering, turning, fog, running, low beam and high beam light outputs.

FIGS. 19 and 20 show the inventive headlamp where the liquid crystal material is arranged in sections rather than bands. This arrangement allows the headlamp to provide AFS. The AFS application may be applied to any embodiment of the present invention as apparent to one of ordinary skill in the art in view of this disclosure. AFS provides a series of beam patterns customized for various road and geographical conditions including town light, motorway light, country light, etc. Light fields may be aimed, expanded and/or contracted to provide increased illumination for different driving conditions (i.e., town light, country light, etc.). The lens cover 709 includes sections 760*a*–760*l* (shown best in FIG. 20) and additional sections 763–766 (shown best in FIG. 19). The sections 760*a*–760*l* and 763–766 comprise liquid crystal material as defined earlier in this specification. In addition, the liquid crystal material is incorporated into the lens cover and coupled to a drive circuit in a manner consistent with earlier described embodiments of the invention. The sections 760*a*, 760*b*, 760*c*, 760*d* and 760*e* provide many different combinations of light output which may improve visibility and driver awareness, especially at night and in hazardous driving conditions. For example, as a vehicle approaches a curve in the road, light emitted through sections 760*a*, 760*b* and 760*c* will be aimed in the direction of the turn. Other sections, such as 760*h*, 760*i*, 760*j* and 760*k* will maintain the illumination of the road directly in front of the vehicle. Thus, a light field is created that allows more light to be aimed in the direction of travel of the vehicle increasing the visibility of the motorists. At the same time, sections 760*d*, 760*c*, 760*f*, 760*g*, 760*e* and 762 can supply running and/or fog lighting or other headlamp functions. The liquid crystal material can be stacked so as to provide for multiple headlamp functions. The stacked material operates consistent with the stacked material in previous embodiments. Sections 763, 764, 765, and 766 comprise the second layer in the stacked portions. These sections can provide for turning or other functions while other bands such as 760*c*, 760*d* and 760*e* provide downrange illumination. Each section is independent and can supply any headlamp function necessary.

In any of the embodiments disclosed in FIGS. 1 through 10, the beam steering liquid crystal may be employed in bands 32, 34, 36 and patches 50 and 50*b* to aim or redirect light transmitted through halogen headlamp assembly to a preferred illumination zone. The operations of the drive circuit would be similar to that as disclosed for the rear projection assembly using the beam steering liquid crystal and would be apparent to those of ordinary skill in the art in view of this disclosure.

The microprocessor 110 of the drive circuit 30 in FIG. 3 can be programmed to energize the liquid crystal material consistent with this embodiment as apparent to those of ordinary skill in the art in view of this disclosure. The turn sensor 111 may be used to monitor the direction of travel so that light can be aimed in such direction to increase driver visibility. Other sensors can also be incorporated through input 115. Sensors include but are not limited to speed, driver reaction, photo sensors and vehicle inclination sensors. By monitoring such things as, among others, vehicle speed and vehicle inclination the microprocessor 110 can provide for the optimum road lighting to provide for the best visibility. For example, as the vehicle's speed increases a signal is sent from the speed sensor to the microprocessor 110. The microprocessor 110 recognizes the increase in speed and activates sections 760*a*, 760*b* and 760*c* to direct light upward to create an increased light field for downrange visibility. Other sections, such as 760*d*, 760*e* and/or 760*k* can also provide downrange lighting, fog light, running light or turning signal. Turning signal is accomplished through stacked liquid crystal material as disclosed previously in this specification. Therefore, any section that is stacked may be used for turning.

A myriad of light output possibilities exist based on the configuration of the liquid crystal material applied to the front of the assembly, the type of lighting desired and input from sensors. The lighting provided for AFS is dependent on the microprocessor programming and input from external sensors. The microprocessor provides optimum lighting based on these sensor inputs. In addition, photometric tests points can be met as well as providing multiple outputs using one light source without the use mechanical devices.

The invention claimed is:

1. A headlamp assembly comprising:
   a light source for emitting light from the headlamp assembly;
   a light source enclosure having a first light transmissive portion which permits light to be transmitted from the light source to a first illumination zone located to the front of the assembly and a second light transmissive portion which permits light to be transmitted from the light source to a second illumination zone located to the side of the assembly, wherein a portion of said enclosure comprising a material which covers selected regions of the first light transmissive portion and the second light transmissive portion of the enclosure and which when electrically energized alters the amount of light transmitted from the light source to the first illumination zone and second illumination zone; and
   a drive circuit electrically coupled to the material for selectively energizing the material and thereby controlling a light output from the headlamp assembly.

2. The headlamp assembly of claim 1 wherein said material communicates with a drive circuit which controls the function and transmission of light from the light source to the first illumination zone and the second illumination zone.

3. The headlamp assembly of claim 1 wherein said first illumination zone is located in the direction of travel of a vehicle and said second illumination zone is located in the direction of turn of a vehicle.

4. The headlamp assembly of claim 1 wherein said material comprises liquid crystal material.

5. The headlamp assembly of claim 4 wherein said liquid crystal is polymer stabilized technology (PST).

6. The headlamp assembly of claim 1 wherein said light source comprises a single multi-filament headlamp bulb wherein at least one filament is of higher intensity and wherein at least one filament is of lower intensity.

7. The headlamp assembly of claim 1 wherein said light source comprises multiple light sources wherein at least one light source is of higher intensity and wherein at least one source is of lower intensity.

8. The headlamp assembly of claim 7 wherein a first light source of higher intensity illuminates the first illumination zone and a second light source of lower intensity illuminates the second illumination zone.

9. The headlamp assembly of claim 1 wherein the first light transmissive portion of the enclosure includes multiple sections of material which can be independently energized to adjust the light output from the light source to the first illumination zone.

10. The headlamp assembly of claim 9 wherein said multiple sections include at least one section for use as a turning signal.

11. The headlamp assembly of claim 9 wherein said sections comprise at least two layers of stacked liquid crystal material for performing multiple lamp functions.

12. The headlamp assembly of claim 1 wherein the second light transmissive portion of the enclosure includes multiple sections wherein said sections are affixed with the material.

13. The headlamp assembly of claim 12 wherein said multiple sections of material illuminate the second illumination zone in proportion to the degree of turn of the vehicle.

14. A process for constructing a headlamp assembly comprising:
   positioning a light source that emits light within an enclosure for transmitting light from the light source to a first illumination zone and to a second illumination zone,
   coupling a lens to the enclosure to intercept light and focus light toward the first and the second illumination zones; and
   coupling the lens to a drive circuit for selectively energizing the lens which when electrically energized focuses an amount of light transmitted to the first illumination zone and the second illumination zone.

15. The process of claim 14 wherein the enclosure comprises a first light transmissive portion and a second light transmissive portion and additionally wherein the lens comprises layers of material such that the layers are isolated from each other to allow each layer to be independently energized.

16. The process of claim 14 where the lens comprises a material is organized in multiple regions covering surfaces of a first light transmissive portion and a second light transmissive portion of the enclosure and wherein each region is independently coupled to the drive circuit to control the light transmitting characteristics of the bands during operation of the assembly.

17. The method of claim 16 wherein the regions comprises multiple bands of material affixed to the first light transmissive portion of the enclosure and are coupled to the drive circuit to independently control the light transmissive states of the bands to provide fog light output, low-beam output and high beam output from the assembly.

18. The method of claim 16 wherein multiple bands of material are affixed to the second light transmissive portion of the assembly and are coupled to the drive circuit to independently control the light transmissive states of the bands to provide cornering light output in the direction of and in proportion to the turn of the vehicle, turning signal output, and running light output.

19. The method of claim 17 additionally comprising providing an interface for monitoring multiple inputs that control the light transmissive state of the multiple bands.

20. The method of claim 14 wherein the energizing of the lens adjusts a level of light transmission from the light source through a region a light transmissive portion of the enclosure to a high light transmissive state, a low light transmissive state, or one or more intermediate light transmissive states.

21. The method of claim 14 wherein the energizing of the lens adjusts a level of light transmission used for cornering light from the light source through a region of a light transmissive portion of the enclosure to a high light transmissive state, a low light transmissive state, or one or more intermediate light transmissive states.

22. The method of claim 14 wherein energizing of the lens is performed by providing a pulse width modulating signal for adjusting the light transmissive state of an associated region of lens material overlying either a first light transmissive portion or a second light transmissive portion of the enclosure.

23. The process of claim 14 where the lens comprises a material that is organized in multiple regions covering surfaces of a light transmissive portion of the enclosure and wherein electrical energization of said material by the drive circuit changes a color of the regionsluring operation of the assembly.

24. The process of claim 14 where the lens comprises a dichroic material that is organized in multiple regions covering surfaces of a light transmissive portion of the enclosure and wherein electrical energization of said dichroic material by the drive circuit changes a color of the region during operation of the assembly.

25. A method of constructing a rear-projection light assembly comprising:
   positioning a light source that emits light and an optical lens within an enclosure having a reflective portion and a light transmissive portion for transmitting light from the light source to an illumination zone,
   affixing a material to the enclosure to cover multiple sections across a surface of the light transmissive portion, and
   coupling the material to a drive circuit for selectively energizing each section of the material which when electrically energized controls a light transmitting characteristic of that section to control the amount of light emitted from the light source to the illumination zone.

26. The process of claim 25 wherein the material is coupled to the light transmissive portion in layers that are isolated from each other to allow independent energization of overlapping layers of said material.

27. The method of claim 25 wherein the multiple sections of material applied to the light transmissive portion of the assembly are coupled to the drive circuit to independently control the light transmissive states of the sections to provide a fog lamp output, a low beam output, cornering light output in the direction of travel of the vehicle, and a high beam output from the assembly.

28. The method of claim 25 additionally comprising providing an user interface for monitoring multiple inputs that control the light transmissive state of the multiple bands.

29. The method of claim 25 additionally comprising additional regions of material that overlap one or more of the multiple sections of the material and wherein the drive circuit is coupled to the additional sections to independently control a light transmissive state of the additional sections.

30. The method of claim 25 wherein the energizing of the material adjusts a level of light transmission from the light source through a region of said material to a high light transmission state, a low light transmission state, or one or more intermediate light transmission states.

31. The method of claim 25 wherein energizing of the material is performed by providing a pulse width modulating signal for adjusting a light transmission state of an associated section of said material.

32. The process of claim 25 where the material is organized in multiple regions covering surfaces of a light transmissive portion of the enclosure and wherein electrical energization of said material by the drive circuit changes a color of the region during operation of the assembly.

33. The process of claim 25 where the material comprises a dichroic material that is organized in multiple regions covering surfaces of a light transmissive portion of the enclosure and wherein electrical energization of said dichroic material by the drive circuit changes a color of the region during operation of the assembly.

34. A lamp assembly comprising:

a light source for emitting light from the assembly;

a light source enclosure having a light transmissive portion for transmitting light from the light source to an illumination zone, wherein a portion of said enclosure includes a material which covers selected regions of the light transmissive portion of the enclosure and which when electrically energized alters an amount of light transmitted from the light source to the illumination zone, wherein said material steers or bends light beams emitted from the light source to the illumination zone; and a drive circuit electrically coupled to the material for selectively energizing the material and thereby controlling a light output from the assembly.

35. The apparatus of claim 34 where the material is organized in multiple regions covering surfaces of the light transmissive portion of the light source enclosure and wherein electrical energization of said material by the drive circuit changes a color of the region during operation of the assembly.

36. The apparatus of claim 34 where the material comprises a dichroic material that is organized in multiple regions covering surfaces of the light transmissive portion of the light source enclosure and wherein electrical energization of said dichroic material by the drive circuit changes a color of the region during operation of the assembly.

37. A process for constructing a headlamp assembly comprising:

positioning a light source that emits light within an enclosure having a first light transmissive portion for transmitting light from the light source to a first illumination zone and a second light transmissive portion for transmitting light from the light source to a second illumination zone, affixing a material to the enclosure to cover selected regions of the first light transmissive portion and the second light transmissive portion; and coupling the material to a drive circuit for selectively energizing the material which when electrically energized alters the light transmitted to the first illumination zone and the second illumination zone;

wherein energizing of the material adjusts a level of light transmission used for cornering light from the light source through a region of said material on the second light transmissive portion to a high light transmissive state, a low light transmissive state, or one or more intermediate light transmissive states.

* * * * *